United States Patent
Clemmen et al.

(10) Patent No.: US 12,422,729 B2
(45) Date of Patent: Sep. 23, 2025

(54) QUASI-DETERMINISTIC SINGLE-PHOTON SOURCE

(71) Applicant: UNIVERSITÉ LIBRE DE BRUXELLES, Brussels (BE)

(72) Inventors: Stéphane Clemmen, Uccle (BE); Serge Massar, Auderghem (BE)

(73) Assignee: UNIVERSITÉ LIBRE DE BRUXELLES, Brussels (BE)

( * ) Notice: Subject to any disclaimer, the term of this patent is extended or adjusted under 35 U.S.C. 154(b) by 196 days.

(21) Appl. No.: 18/030,606

(22) PCT Filed: Oct. 8, 2021

(86) PCT No.: PCT/EP2021/077866
§ 371 (c)(1),
(2) Date: Apr. 6, 2023

(87) PCT Pub. No.: WO2022/074197
PCT Pub. Date: Apr. 14, 2022

(65) Prior Publication Data
US 2023/0367176 A1 Nov. 16, 2023

(30) Foreign Application Priority Data
Oct. 8, 2020 (EP) .................... 20200829

(51) Int. Cl.
*G02F 1/35* (2006.01)
*G01J 3/28* (2006.01)

(52) U.S. Cl.
CPC .............. *G02F 1/3507* (2021.01); *G01J 3/28* (2013.01); *G02F 1/3526* (2013.01); *G02F 1/353* (2013.01)

(58) Field of Classification Search
CPC ...... G02F 1/3507; G02F 1/3526; G02F 1/353; G01J 3/28
See application file for complete search history.

(56) References Cited

U.S. PATENT DOCUMENTS 10,379,420 B1 8/2019 Wang
2018/0231868 A1* 8/2018 Grice .................... H04B 10/70

FOREIGN PATENT DOCUMENTS

| KR | 101573867 B1 | 12/2015 |
| WO | 2017034638 A1 | 3/2017 |
| WO | 2018147924 A1 | 8/2018 |

OTHER PUBLICATIONS

Davis et al., "Pulsed single-photon spectrograph by frequency-to-time mapping using chirped fiber Bragg gratings", Cornell University Library, Oct. 10, 2016.

(Continued)

*Primary Examiner* — Thanh Luu
(74) *Attorney, Agent, or Firm* — Workman Nydegger

(57) ABSTRACT

A quasi-deterministic single-photon source and method of generating single photons on demand are disclosed. The single-photon source includes photon pair generation for generating a heralding and heralded photon in a frequency-correlated photon pair, a single-photon spectrometer adapted to detect the heralding photon and to generate an output signal that is indicative of the frequency of the detected heralding photon, a pulse shaper arrangement for reshaping a broadband pulse, and an optical frequency conversion means for converting, upon irradiation with a reshaped pulse, a heralded photon into a single output photon with deterministic source frequency. The pulse shaper arrangement is configured to select, based on the spectrometer output signal, only frequency components of the broadband pulse that substantially coincide with the heralding photon frequency or with a constant detuning thereof.

17 Claims, 4 Drawing Sheets

(56) References Cited

OTHER PUBLICATIONS

European Office Action from corresponding EP Application No. 21789736.2, May 16, 2024.
Joshi et al. "Frequency Multiplexing for Quasi-Deterministic Heralded Single-Photon Sources," Nature Communications, vol. 9, No. 847 Feb. 27, 2018, pp. 1-8.
Davis et al: "Measuring the Single-Photon Temporal-Spectral Wave Function", Arxiv.org, Cornell University Library, Sep. 15, 2017, pp. 1-7.
Meyer-Scott et al: "Single-Photon Sources: Approaching the Ideal through Multiplexing", Review of Scientific Instruments, AIP, vol. 91, No. 4, Apr. 30, 2020, pp. 041101-1-041101-18.
Matsuda, "Deterministic Reshaping of Single-Photon Spectra Using Cross-Phase Modulation", Science Advances, vol. 2, No. 3, Mar. 25, 2016, pp. 1-7.
International Search Report from corresponding PCT Application No. PCT/EP2021/077866, Jan. 5, 2022.
Extended European Search Report from corresponding European Application No. 20200829.8, Mar. 18, 2021.
International Preliminary Report on Patentability from corresponding PCT Application No. PCT/EP2021/077866, Jan. 2, 2023.

\* cited by examiner

QUASI-DETERMINISTIC SINGLE-PHOTON SOURCE

FIELD OF THE INVENTION

The present invention relates to the field of single-photon sources and methods of generating single photons. More specifically, it relates to quasi-deterministic, frequency-multiplexed heralded single-photon sources.

BACKGROUND OF THE INVENTION

On-demand single-photon sources are a fundamental resource in quantum communication, quantum cryptography and a quantum computing applications, and are also at the heart of much research on the quantum behavior of light and light-matter interactions. Unlike probabilistic sources of single photons, on-demand sources emit a single photon with quasi-certainty each time they are triggered. This makes the process of single-photon generation and distribution more reliable and efficient in practical quantum technology applications.

Most of the currently available on-demand single-photon sources are realized in solid-state materials, including N-V centers, color centers, quantum dots. Although they emit single photons reliably and with high purity, the repeated generation of indistinguishable single-photon states requires a precise control of the environment in which the photon source is operating. Considerable resources are spent on cooling, e.g. in a cryostat, and accurately controlling the temperature of these sources, which hampers the widespread use of these sources. Moreover, efficient coupling of the generated single photons into a transparent transmission medium or photon storage means are necessary to avoid photon losses which negatively impact the on-demand property of the source.

A different class of single-photon sources is uses the principle of heralding the arrival of a single first photon by detecting the presence of a second photon which is energy-time correlated with the heralded first photon. These heralded photon sources exploit the fact that pairs of correlated photons are produced spontaneously in certain nonlinear optical interactions under a strong pump, for example in spontaneous parametric down-conversion in which a fission event of pump photons creates two lower-energy photons. A disadvantage of these sources is that they are probabilistic in nature. In consequence, the arrival of single photons at a target frequency is not certain for each triggering event of the source.

Progress has been made to turn probabilistic heralded single-photon sources into quasi-deterministic sources for which a single photon is emitted with quasi-certainty each time the source is triggered. For example, active time-multiplexing of a plurality of individual heralded single-photon sources has been found to significantly increase the probability that a single photon is emitted by any one of the plurality of sources if triggered in unison. A disadvantage of time-multiplexed heralded photon sources is that a large number of individual sources is needed to achieve quasi-certain single-photon emission on demand. This is resource intensive and makes these sources economically less attractive. Moreover, the switching losses do not scale well with the increased number of individual sources.

Another example of quasi-deterministic heralded photon sources has been described in Joshi, C. et al. "Frequency multiplexing for quasi-deterministic heralded single-photon sources," NATURE COMMUNICATIONS, vol. 9, 2018. Therein the authors propose to use an active frequency-multiplexing technique as an equivalent of having a plurality of individual sources. Photons are generated independently in different frequency bins and many frequency bins are in principle available. The switching loss scaling is avoided in this approach. However, the up-conversion of the heralded single photons to a single photon at the targeted output frequency of the source requires the replication of expensive high-power pulsed laser sources, proportional in number to the number of frequency bins used.

In patent document WO2018/147924 A1 an actively frequency-multiplexed heralded single-photon source is disclosed, which overcomes the problem of scaling the number of laser sources for frequency up-conversion of the heralded single photons. A modulator is used to shift the frequency of the heralded photon. However, most conventional and even the fastest available optical phase-modulators for carrying out the frequency-shift have a limited modulation bandwidth. This severely limits the number of usable frequency bins and leads to less reliable on-demand sources.

There is still a need for on-demand single-photon sources with a high emission probability of single photons which are less resource-intensive.

SUMMARY OF THE INVENTION

It is an object of embodiments of the present invention to provide on-demand single-photon sources with a high emission probability of single photons which are less resource-intensive.

The above objective is accomplished by a method and device according to the present invention.

In one aspect he present invention relates to a quasi-deterministic single-photon source which comprises a photon pair generation means for generating a narrowband heralding photon with frequency $f_i$ and a narrowband heralded photon with frequency $f_s$ as a frequency-correlated photon pair upon irradiation with a pulse of pump light. The heralding photon frequency $f_i$ of each photon pair is randomly distributed over an available bandwidth for active frequency-multiplexing of heralding photons $\Delta f_{MUX}$. As a consequence thereof, the frequency of the heralding photon is a priori unknown and varies from shot to shot. However, the heralding photon frequency is taking values in the range of active frequency-multiplexing of heralding photons $\Delta f_{MUX}$. Additionally, the heralded photon frequency $f_s$ of each photon pair is determined by the heralding photon frequency $f_i$ of that same frequency-correlated photon pair. The single-photon source also comprises a single-photon spectrometer which is adapted to generate an output signal upon detection of a heralding photon, which output signal is indicative of the frequency $f_i$ of the detected heralding photon. A pulse shaper arrangement of the single-photon source is operable at least over the available bandwidth for active frequency-multiplexing of heralding photons $\Delta f_{MUX}$ and adapted for reshaping a broadband optical pulse. This implies that the pulse shaper arrangement is capable of accepting and properly reshaping optical pulses whose bandwidth encompasses at least the available bandwidth for active frequency-multiplexing of heralding photons $\Delta f_{MUX}$. Besides, the pulse shaper arrangement is configured for receiving output signals generated by the single-photon spectrometer, and for selecting and transmitting only frequency components $f_{sel}$ of the broadband pulse that substantially coincide with the frequency of the detected heralding photon, or with a constant frequency detuning thereof, thereby reshaping the broadband optical pulse into a narrowband optical pulse. An optical frequency conversion means of the single-photon source is adapted for converting the heralded photon corresponding to the detected heralding photon into a single output photon with deterministic source frequency $f_{src}$ upon irradiation with a reshaped optical pulse delivered by the pulse shaper arrangement.

It is an advantage of some embodiments of the invention that the single-photon source can be made wavelength tunable. This is achieved by making the constant frequency detuning for the selection and transmission of frequency components $f_{sel}$ of the broadband pulse by the pulse shaper arrangement a user-defined or user-controlled input variable. There are at least two ways to gain control over the constant frequency detuning of the selected and transmitted frequency components $f_{sel}$. A first option is to tune the center frequency of the excitation laser source whose laser output pulses are used to generate the photon pairs in the pair generation means, e.g. an offset frequency indicative of the constant frequency detuning. In this case energy-conservation dictates a frequency/wavelength shift of the heralding photon, which is reflected by a corresponding frequency/wavelength shift of the single output photon. A second option is to apply a controllable frequency detuning directly to the pulse shaper arrangement. For example, a pulse picker element of the pulse shaper arrangement, such as an electro-optic modulator, can be actuated by a delayed trigger pulse, e.g. so as to carve out the selected frequency components $f_{sel}$ from the broadband spectrum of the classical optical pulse admitted by the pulse shaper arrangement at a specific moment in time set by the trigger pulse delay, wherein the total delay is the sum of a variable delay, representing the non-deterministic frequency of the detected heralding photon, and a fixed, deterministic delay, representing the user-defined input for the amount of frequency/wavelength detuning in the emitted single output photons.

Alternatively, the flexibility provided by the wavelength tunability of the deterministic output wavelength of the single-photon source can be exploited in a feedback loop which stabilizes the single-photon source against drifts in the single-photon output wavelength (i.e. source output frequency), e.g. temperature drifts, vibration induced drifts and the like. For instance, temperature sensors, vibration sensors, and other sensors that may be relevant for stabilization of the single-photon source output frequency, may be provided to measure environmental perturbations and a controller (e.g. PID controller, microcontroller, or similar) may derive a corrective feedback signal from the measured perturbations. Alternatively, single output photons can be emitted on demand, e.g. at regular time intervals, for the purpose of measuring the output frequency of the single-photon source. Potential drifts of the output frequency are then directly derivable from these measurement. The corrective feedback signal compensates for the drifts in the single-photon source output frequency, e.g. on a timescale of the single-photon emission rate or on average over a larger number of single-photon emission events (e.g. tens or hundreds of events). The feedback signal can be applied to either the excitation laser source for photon pair generation or the pulse shaper arrangement, e.g. the pulse picker thereof, e.g. the EO-modulator, as explained before.

According to the invention, the single-photon spectrometer, the pulse shaper arrangement and the optical frequency conversion means have the combined effect of acting as a single-photon transducer, i.e. as a device or arrangement that is capable of detecting a single heralding photon and of re-emitting, preferably with low latency below 100 ns, a shaped optical pulse with the same frequency as the detected heralding photon, or a constant frequency detuning thereof. Preferably, the single-photon transducer is adapted to re-emit the shaped optical pulse with the same time duration and frequency as the detected heralding photon, or a constant frequency detuning thereof.

According to some embodiments of the present invention, the pulse shaper arrangement comprises only a single dispersive element, which induces group delay dispersion asymmetrically, e.g. either positive or negative, with respect to the propagation direction of light passing through the dispersive element. Such embodiments have the advantage that the number of dispersive elements needed to assemble the pulse shaper arrangement can be reduced. Moreover, the magnitude of group delay dispersion is independent of the propagation direction of light, which automatically results in an overall group delay of the reshaped pulse, when delivered by the pulse shaper arrangement, which does not depend on the particular selected frequency components.

According to other embodiments of the invention, the pulse shaper arrangement comprises at least a first and a second dispersive element, and a pulse picking element disposed between the first and second dispersive element. The first and second dispersive element have matched group delay dispersion magnitudes, but opposite signs. Such embodiments are useful in cases in which the dispersive elements of the pulse shaper arrangement are symmetrical, e.g. invariant to a reversal of the propagation direction of light passing through them.

In some embodiments of the invention, the dispersive elements of the pulse shaper arrangement are spatially dispersive, e.g. they direct different frequency components of the broadband optical pulse into different spatial directions (frequency-to-space mapping). The differently colored light of the broadband pulse may be dispersed in one space direction, for instance along a line, or in two space directions, for instance onto a 2D-plane. The dispersive elements may be adapted to disperse the light continuously in space or discontinuously, for instance into a sequence of individual stripes or an array of individual spots. Accordingly, the pulse picking element may be provided as a line or a surface element, capable of selectively transmitting or reflecting light directed to a plurality of different directions. Such embodiments have the advantage that broadband optical pulses with a very large bandwidth for active frequency-multiplexing of heralding photons ($\Delta f_{MUX}$), embracing a very large number of frequency bins, can be dispersed in space without incurring too much optical losses.

In other embodiments of the invention, the dispersive elements of the pulse shaper arrangement are temporally dispersive, e.g. they direct different frequency components of the broadband optical pulse along a same spatial direction but stretch the broadband pulse in time by changing the group delay of the broadband pulse as a function of its frequency components (frequency-to-time mapping), for instance by applying a chirp to the broadband pulse. Accordingly, the pulse picking element is selecting the frequency components that substantially coincide with the heralding photon frequency or with a constant offset thereof, by transmitting or reflecting a short portion of the stretched broadband pulse for which a time of passage at the pulse picking element substantially coincides with the amount of group delay experienced by broadband pulse light of the heralding photon frequency. Such embodiments have the advantage that the pulse shaper arrangement can be made more compact and less complex and that pulse picking element can be switched quickly, avoiding long propagation delays of the buffered heralded photon. Moreover, a pulse shaper according to such embodiments is easily synchronized with an output signal of the single-photon spectrometer in which a delay time is representing the frequency of the detected heralding photon. In particular, the same dispersive element or dispersive element with substantially equal group delay dispersion characteristic can be used for both the pulse shaper arrangement and a temporally dispersing single-photon spectrometer. This matching of the group delay dispersion characteristic of the pulse shaper arrangement and the single-photon spectrometer has the additional advantage that synchronization between the pulse shaper arrangement and the single-photon spectrometer, and hence the frequency selection by the pulse shaper arrangement of frequency components coinciding with the detected heralding photon frequency or a constant frequency offset thereof, can be made very accurate. It may also allow to further reduce the number of photon source components.

In yet other embodiments of the invention, the pulse shaper arrangement may be configured to combine frequency-to-space mapping and frequency-to-time mapping of the broadband optical pulse. This can be advantageously used to increase the number of frequency bins in the available bandwidth for active frequency-multiplexing of heralding photons ($\Delta f_{MUX}$) and/or to increase the available bandwidth for active frequency-multiplexing of heralding photons ($\Delta f_{MUX}$).

In embodiments of the invention in which the pulse shaper arrangement is configured to spatially map the different frequency components of the broadband pulse to different space locations, the pulse picking element preferably comprises, or consists of, a spatial array of light modulating elements, for instance a liquid crystal spatial light modulator (SLM) or a MEMS-based SLM. In embodiments of the invention in which the pulse shaper arrangement is configured to temporally map the different frequency components of the broadband pulse to different passage times at the pulse picking element, the picking element preferably comprises, or consists of, an electrically addressable electro-optic light modulator.

According to some embodiments of the invention, the single-photon spectrometer is adapted to spread an arrival time of heralding photons in time, as a function of the heralding photon frequency, and to resolve the arrival time of a detected heralding photon. The single-photon spectrometer may generate an output signal which is delayed by a time delay indicative of the detected heralding photon frequency. Such a single-photon spectrometer may comprise a temporally dispersing member coupled to a photodetection means capable of time-resolved single-photon detection.

According to some other embodiments of the invention, the single-photon spectrometer is adapted to spatially separate heralding photons as a function of the heralding photon frequency, and to correlate a spatial location of detection to the frequency of the detected heralding photon. Such a single-photon spectrometer may comprise a spatially dispersing member, for instance a wavelength division demultiplexing device, coupled to an array of single-photon detectors. Additionally, the single-photon spectrometer may comprise fast electronics to generate an output signal indicative of the detected heralding photon frequency, for example by selecting the single-photon detector at the spatial location where a heralding photon was first registered.

A single-photon source according to embodiments of the invention may comprise delayed means to convert a delayed output signal with variable time delay into an address signal for selecting one of a plurality of electrically addressable light modulating elements of the pulse shaper arrangement, for instance an electronic conversion unit or analog to digital converter configured to compare the delayed output signal, e.g. a signal edge or flank, to the instantaneous value of an incremental counter and use the digital counter value as address signal. Likewise, a single-photon source according to same or other embodiments of the invention may comprise means to convert an output signal suitable for selecting one of a plurality of electrically addressable light modulating elements of the pulse shaper arrangement into a delayed output signal with variable time delay, for instance a pulse delay generator configured to generate an output pulse at a time delay that is proportional to the linear position of the light modulating element in an array of light modulating elements of the pulse shaper arrangement, which is addressed by the output signal suitable for selecting one of a plurality of electrically addressable light modulating elements.

In particular embodiments of the invention, only a single light source is provided, which is capable of delivering broadband optical pulses whose bandwidth is at least as large as the available bandwidth for active frequency-multiplexing of heralding photons ($\Delta f_{MUX}$). Such embodiments are particularly attractive in terms of compactness, weight and cost.

The single-photon source may be provided as an all-fiber implementation, as a photonic integrated chip, or a combination of both.

The present invention also relates to a method for generating single photons on demand, as set out in the claims.

Embodiments of the invention have the advantage that high repetition rates in the megahertz region are obtainable for the on-demand production of single output photons. It is a further advantage of embodiments of the invention that indistinguishable output photons can be produced on demand. In particular, indistinguishable photons can also be obtained across a plurality of single-photon sources according to the present invention. This contrasts with single-photon emitters like quantum dots, for which emission properties often differ significantly from emitter to emitter.

It is an advantage of embodiments of the invention that a reliable and repeatable quasi-deterministic single-photon source can be implemented with less resources and/or in way that makes it easier to operate. In particular, no vacuum, fast photon router/multiplexer, or cryostats are required. For instance, a set of n independent heralded photon pair sources, even if multiplexed, would still require n=90 such sources in order to achieve an effective single-photon emission probability $p_{eff}$ that is at least 95%, wherein $p_{eff}$ is determined from the single-photon emission probability $p_e$ of a single one heralded photon pair source as $p_{eff}=1-(1-p_e)^n$. In contrast thereto, a single-photon source according to the invention uses active multiplexing of n distinct frequency channels and only requires a single heralded photon pair source.

It is a further advantage of embodiments of the invention that the quasi-deterministic single-photon source is less sensitive to the environmental conditions under which it operates.

It is an advantage of embodiments of the invention that a success rate of delivering a single photon at the output of the source is primarily limited by the optical coupling and insertion losses of its components. This is in contrast to classical heralded single-photon sources, i.e. not multiplexed, for which the probability of heralding a single photon cannot, indeed, exceed approximately 25%. Reducing the optical losses thus increases the success rate, which may be higher than 70%, for instance 80% or more. The development of more efficient, e.g. less lossy, optical components thus allows for future improvements of the single-photon source, or of an upgrading thereof.

It is an advantage of embodiments of the invention that frequency-multiplexing of heralding photons is possible over a very large optical bandwidth, or equivalently for a very large number of frequency bins, which makes the single-photon source behave quasi-deterministically. The available bandwidth for frequency-multiplexing of heralding photons, or equivalently the number of frequency bins, can be decoupled from the operating electrical bandwidth/modulation bandwidth of the pulse shaper arrangement, e.g. the electrical bandwidth/modulation bandwidth of the pulse picking element therein. In consequence, relatively short heralding photons, e.g. of sub-nanosecond duration, with a wide range of different frequencies can be frequency-multiplexed, and high repetition rates of the single-photon source can be obtained. The effective number of frequency bins (or channels or equivalent number of single-photon emitters), i.e. the optical bandwidth over which active frequency-multiplexing is supported and carried out divided by the much narrower linewidth of the photon wave packets, may be more than 20, preferably more than 50, e.g. between 50 and 500, such as between 100 and 300.

Given the large effective/equivalent number of frequency channels available to the actively frequency-multiplexed single-photon source, embodiments of the invention have the further advantage that a high single-photon emission probability $p_{eff}$ can be obtained even for small collection efficiencies for the heralding photons. Here, collection efficiency is defined as the product of photon pair production probability, probability of transmitting the heralding photon without loss before detection in the single-photon spectrometer takes place, and detection efficiency of the single-photon spectrometer. Aiming at a single-photon emission probability $p_{eff}$ of 97%, for example, an effective number of about 300 multiplexed frequency channels warrants a collection efficiency of as little as 1.2% for the heralding photon. A collection efficiency of 1.2% may be composed of a 5% chance of generating a photon pair, a 30% probability of loss-free transmission of the heralding photon (e.g. limited by the temporally dispersive member of the single-photon spectrometer), and a detection efficiency of 80%. A single-photon source according to embodiments of the invention has the advantage that it enables active frequency multiplexing with respect to an increased number of different heralding photon frequencies. A single-photon source according to embodiments of the invention scales well with this increased number of different heralding photon frequencies; in particular its optical losses are not a function of the number of different heralding photon frequencies (e.g. number of equivalent multiplexed single-photon emitters) and they do not increase as the number of different heralding photon frequencies is increased. Likewise, the variable frequency conversion of the heralded photon into the single output photon of the source does not require the presence of as many lasers as there are different frequency channels/bins to be actively frequency-multiplexed in the source and neither is a fast logic gate needed to select one of the many lasers. Moreover, preferred embodiments of the invention only require exactly one single-photon detector as part of the single-photon spectrometer, instead of providing a single-photon detector for each frequency channel (having a substantially non-zero probability of being occupied by a generated heralding photon) separately. A single-photon detector has the further advantage that its intrinsic deadtime achieves the same effect of selecting one and only one heralding photon out of a possible stream of heralding photons as a dedicated fast logic circuit. Subsequent heralding photons are left undetected during the detector deadtime (nonresponsive to further events) and are thus discarded.

It is a further advantage of embodiments of the invention that highly versatile quasi-deterministic single-photon sources, e.g. in terms of wavelength tunability of the single output photon and/or longer coherence times, are obtainable.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, in which.

Figure 1:
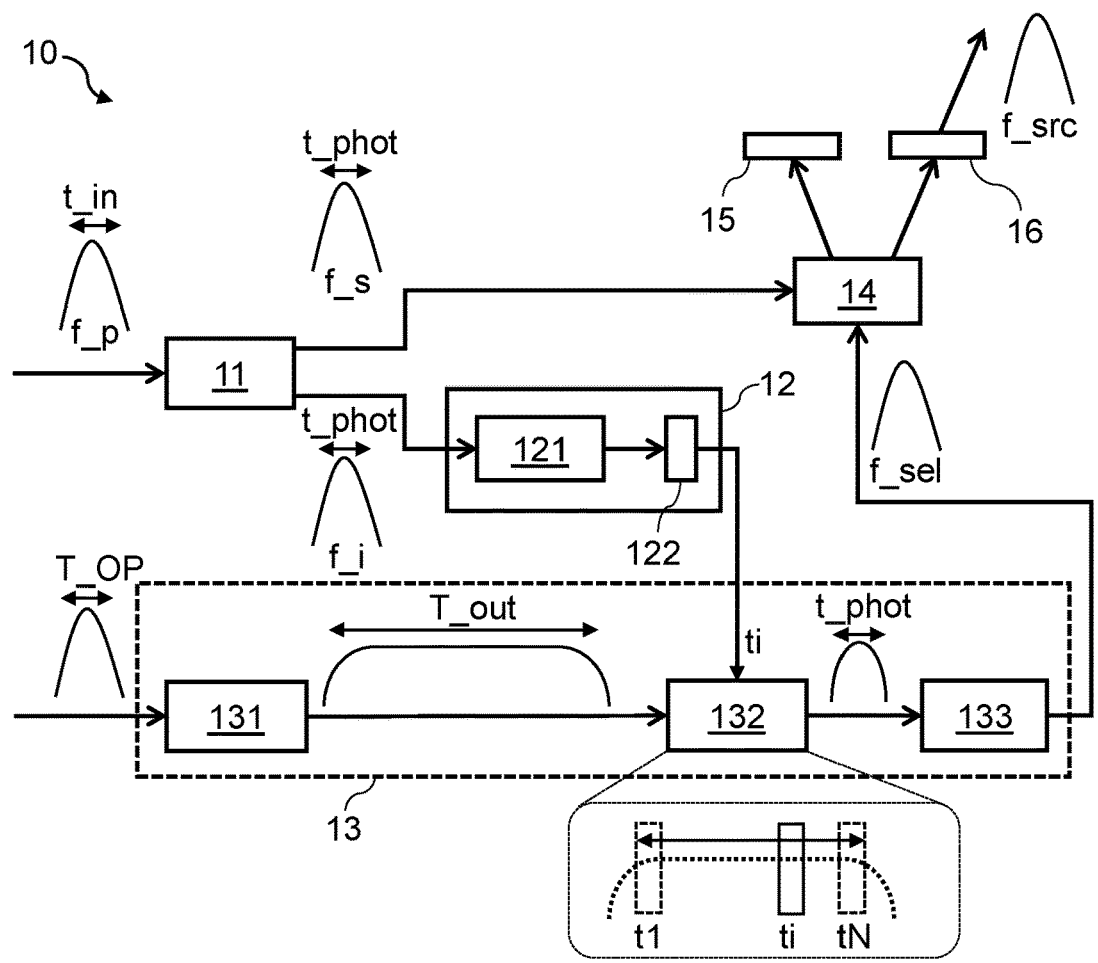
FIG. 1 shows a single-photon source according to embodiments of the invention.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the invention.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the context of the present invention, a single-photon source producing single output photons at a deterministic source frequency on demand relates to a single-photon source for which the output frequency content, i.e. the single-photon spectrum, is stable over time and does not fluctuate significantly from shot to shot. This is also understood to encompass wavelength-tunable single-photon sources, in which the wavelength of the single output photon is controllably tunable and thus still results in a deterministic single-photon source output frequency/wavelength.

In the context of the present invention, a frequency of a output photon, heralded photon or heralding photon refers to the center or carrier frequency of the photon wave packet, i.e. the expected mean value of the energy operator divided by Planck's constant for the photon wave packet. As these photons are of narrow bandwidth, a spread in their (center) frequency is much smaller than the frequency itself. Therefore, the output photons, heralded photons and heralding photons can all be labeled and identified by their (center) frequency.

In the context of the present invention, a spatially dispersive element, member or component of the single-photon source differs from a temporally dispersive one in that the light received by the spatially dispersive element is spread over a plurality of spatial directions that differ from the propagation direction of light upon reception. It is possible, however, that the spatially separated frequency components of light dispersed by the spatially dispersive element also have a varying group delay.

Moreover, the narrow optical bandwidth (e.g. 3 dB or 10 dB bandwidth) occupied by individual ones of the heralding and heralded photons is typically of the same order of magnitude, e.g. is limited by, the spectral width of one out of the many frequency bins that compose the available spectral bandwidth for active multiplexing of heralding photons, i.e. the spectral width that could be attributed to an imaginary, probabilistic single-photon emitter which solely emits heralding photons of a fixed frequency. In contrast thereto, optical photon wave packets or classical optical pulses are considered to be broadband if their spectral content, i.e. their spread about the center frequency, is large enough to encompass several of these frequency bins. Hence, selected frequency components are considered to substantially coincide with the heralding photon frequency, or with the heralding photon frequency plus a constant frequency offset, if they overlap with the narrow spectrum of the heralding photon wave packet or with a frequency-shifted version thereof, shifted by a constant frequency offset. However, selected frequency components are considered to not substantially coincide with the heralding photon frequency, or with the heralding photon frequency plus a constant frequency offset, if their spectral width overlaps with several of the aforementioned frequency bins, resulting in an experimentally observable reduction of the Hon-Ou-Mandel effect (dip) of two successive output photons of the single-photon source, being fed to a two-photon interferometer.

In the context of the present invention, an effective number of frequency bins or frequency channels of the frequency-multiplexed single-photon source can also be defined by the ratio of the optical bandwidth associated with the classical broadband pulse to be reshaped to the optical bandwidth associated with the reshaped classical pulse. Here, the optical bandwidth associated with the reshaped classical pulse may coincide with the optical linewidth of the heralding photon, or with the spectral resolution of the single-photon spectrometer. An alternative definition of effective number of frequency bins or frequency channels of the frequency-multiplexed single-photon source is given by the ratio of the pulse shaper's group delay dispersion parameter to the average time duration of the heralding photon, multiplied by the pulse shaper's operative bandwidth (e.g. the acceptance bandwidth over which a linear chirp can be achieved). Here, the average time duration of the heralding photon generally corresponds to that of the laser pulse used for excitation of the photon pair generation means. An embodiment of the invention will now be described with reference to FIG. 1. A quasi-deterministic single-photon source 10 comprises photon pair generation means 11, a single-photon spectrometer 12, a pulse shaper arrangement 13, and an optical frequency conversion means 14. The photon pair generation means 11 is adapted for generating a heralding and a heralded photon in a frequency-correlated photon pair upon irradiation with light. Typically, a pulse of pump light is used to irradiate the photon pair generation means 11. Generated heralded and heralding photon correspond to one-photon wave packets with center frequencies $f_s$ and $f_i$ (expectation values for the energy operator, divided by Planck's constant) respectively. These one-photon wave packets each have a finite spectral width (linewidth or standard deviation for the energy operator, divided by Planck's constant). A center frequency $f_s$ associated with the heralded photon in each pair is determined by the center frequency $f_i$ of the heralding photon generated in that same photon pair. This correlation of frequencies is a consequence of energy conservation during the nonlinear optical process that is underlying the photon pair generation process. Preferably, the detection of one of the photons of the pair, e.g. the heralding photon, projects the other photon of that same pair, e.g. the heralded photon, onto a Fourier-transform limited single-photon state. That has the advantage that the uncertainty product of frequency and time with respect to the projected photon is minimal, ensuring that the single-photon source reliably generates output photons at the correct time and with the correct source center frequency through frequency conversion of the projected photons. This also reduces the rate at output photons are lost or absent an improves the indistinguishability of the generated output photons, e.g. output photons are preferably monomode. Taking the spontaneous parametric down-conversion process as one example of generating a frequency-correlated photon pair from an intense classical pulse of pump light at center frequency $f_p$, the conservation of energy during this process dictates that the following relationship has to be true, up to a degree of frequency uncertainty that is due to the finite bandwidth of the pump pulse: $f_s=f_p-f_i$. Hence, the frequencies of the generated heralded and heralding photon of a same pair are strongly correlated if the finite bandwidth of the pump pulse is small compared to the available bandwidth for photon pair generation. The available bandwidth for photon pair generation may be determined via the spectral efficiency curve associated with the nonlinear parametric frequency conversion process underlying the generation of photon pairs, which describes the efficiency of this process at a given pump frequency $f_p$ as a function of a wave vector mismatch marking the degree of departure from the point of exact phase-matching (i.e. zero wave vector mismatch).

Figure 4:
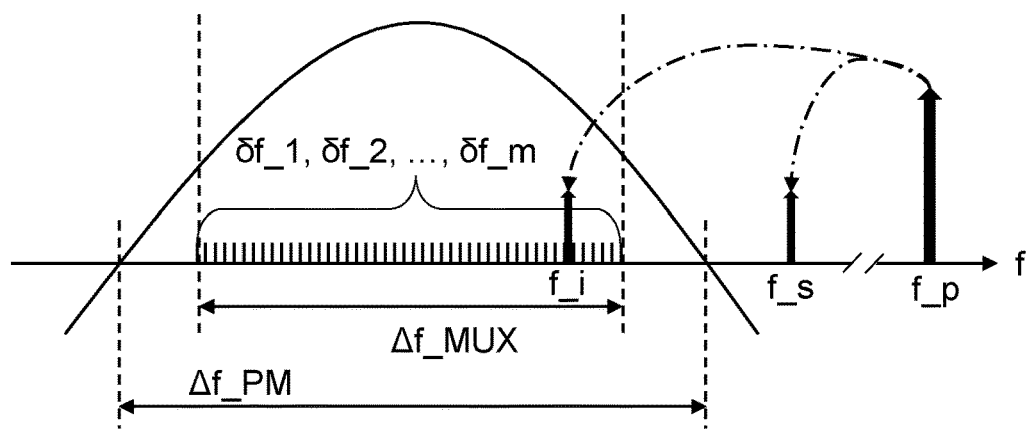
FIG. 4 explains the relationship between the phase-matching bandwidth of a nonlinear parametric process for photon pair generation, the effectively available bandwidth for active frequency multiplexing of heralded photons, and a collection of frequency bins associated with equivalent single-photon emitters, which is relied on in embodiments of the invention.

FIG. 4 illustrates how the center frequency $f_i$ associated with the heralding photon in each pair is randomly distributed over the effectively available bandwidth $\Delta f_{MUX}$ for active multiplexing of heralded photons. It is noted that the effectively available bandwidth $\Delta f_{MUX}$ for active multiplexing of heralded photons may indeed be smaller than the available phase-matching bandwidth/parametric gain bandwidth $\Delta f_{PM}$ associated with the nonlinear optical process producing the correlated photon pair. This situation is encountered, for instance, in embodiments of the invention in which the flux of generated photon pairs, or only one of the heralding and heralded photons of those pairs, is spectrally filtered. If a passband associated with the spectral filtering has a limited optical bandwidth that is smaller than the available phase-matching bandwidth $\Delta f_{PM}$, the resulting bandwidth $\Delta f_{MUX}$ that is available for active multiplexing of heralded photons is reduced compared to the originally available phase-matching bandwidth. Similarly, the bandwidth $\Delta f_{MUX}$ that is available for active multiplexing of heralded photons is smaller than the originally available phase-matching bandwidth if one or more components of the single-photon source which influence the outcome of the frequency conversion process, converting heralded photons into output photons, have an operating bandwidth (e.g. acceptance bandwidth) that is smaller than the originally available phase-matching bandwidth. In such a case, the effectively available bandwidth $\Delta f_{MUX}$ for active multiplexing of heralded photons corresponds to the smallest operating bandwidth among said one or more components of the single-photon source. The splitting of one pump photon into one heralded photon and heralding photon is also depicted in FIG. 4 and corresponds to the aforementioned nonlinear process of spontaneous parametric down-conversion, as it may be obtained in a (quasi-) phase-matched nonlinear crystal or waveguide, which may be inserted into, or form, a cavity for cavity-enhanced photon pair production. Besides, it is possible to identify measured center frequencies $f_i$ of the heralding photon with one of a collection of m individual frequency bins $\delta f_1, \delta f_2, \ldots, \delta f_m$, which span the continuous interval of actively multiplexed heralding photons and which can be used to model the photon pair generation process by means of an equivalent collection of m independent single-photon emitters. Each one of these m modelled equivalent single-photon emitters can be thought of providing a heralding photon and correlated heralded photon in a non-deterministic way when irradiated by the pump light pulse and a center frequency of a heralding photon provided by each one of the m equivalent single-photon emitters corresponds to a respective one of the m different center frequencies $f_1, f_2, \ldots, f_m$. of the collection of frequency bins $\delta f_1, \delta f_2, \ldots, \delta f_m$.

The photon pair generation means 11 is adapted to receive pump light, e.g. via an input facet (e.g. crystal facet or waveguide end facet) or an input coupler connected to a nonlinear waveguide, and is configured to induce an energy-conserving parametric frequency conversion process in which at least one photon of the received pump light is annihilated and a photon pair comprising the frequency-correlated heralding and heralded photon is created. An input facet or input coupler may comprise means for reducing pump light reflection, e.g. antireflection coatings. A spontaneous parametric down-conversion process is inducible in a photon pair generation means 11 which comprises, or consists of, a nonlinear optical element (e.g. nonlinear crystal or waveguide) with quadratic nonlinearity. Alternatively, a spontaneous four-wave mixing process is inducible in a photon-pair generation means 11 which comprises, or consists of, a nonlinear optical element (e.g. nonlinear crystal or waveguide) with cubic nonlinearity. The spontaneous four-wave mixing process may be degenerate, i.e. pump light with photons of only one wavelength is supplied to the nonlinear optical element, or may be non-degenerate, i.e. the supplied pump light comprises photons of two different wavelengths. As the parametric frequency conversion process is induced only if also momentum (k-vector) is conserved, configuration of the photon pair generation means 11 comprises fulfilling a phase-matching condition. Depending on the refractive index ellipsoid and dispersion properties of the nonlinear optical element in which phase-matching takes place, one of type-0, type-I and type-II phase-matching condition may be selected. Exemplary nonlinear optical elements for the photon pair generation means 11 may include nonlinear bulk crystals, such as Lithium Triborate (LBO), Beta Barium Borate (BBO), Potassium Titanyl Phosphate (KTP), Potassium Titanyl Arsenate (KTA), Potassium Dihydrogen Phosphate (KDP), Potassium Dideuterium Phosphate (DKDP), Lithium Iodate (LiIO3), Lithium Niobate (LiNbO3), etc., nonlinear optical fibers, e.g. Kerr-effect silica-based fibers or photonic crystal fibers, or nonlinear integrated waveguides, e.g. integrated silicon-based, Lithium Niobate-based or chalcogenide (e.g. GeSbS) glass waveguides on a photonic integrated circuit (PIC). The nonlinear optical element may include a periodic poling structure or a phase grating structure, e.g. in order to realize quasi-phase-matched or Bragg grating assisted parametric frequency conversion.

Embodiments of the invention using nonlinear waveguides, e.g. integrated waveguides on a PIC or an optical fiber, have the advantage that collinear is obtainable, avoiding beam misalignment issues, and that the pump light irradiance can be high due to the good transverse light confinement properties along the nonlinear waveguide. Hence, a high conversion efficiency for the photon pair generation process can be achieved, i.e. a pulse peak power per input pulse for generating at least one photon pair can be made small, but is not mandatory for the purpose of generating less than one photon pair per mode (frequency bin) in embodiments of the present invention. A person of ordinary skill in the art is sufficiently experienced to adjust a number of photon pair generation events per pump pulse so that best performance is reached, e.g. not too low to avoid that no photon pair is being generated and not too high to avoid that more than one photon pair is being generated in the modes. While the first case of zero generated photon pairs fails to deliver an output photon at the output of the single-photon source, the second case of more than one photon generated photon pairs in a same mode (frequency bin) bears the risk that more than just a single photon at the output wavelength is eventually provided as the main output of the single-photon source. Therefore, the intensity of the pump light pulse(s) in the photon pair generating means is preferably controlled. Moreover, the group velocity dispersion (GVD) properties of a waveguide can be tailored by design such that flat, nearly zero group velocity is realized over a wide spectral range. Consequently, a large phase-matching bandwidth can be obtained over a wide range of pump frequencies, e.g. phase-matching bandwidths as large as 1 THz or larger, e.g. 10 THz or larger. By way of example, when pumping a 5 m long optical fiber close to its zero group velocity dispersion wavelength (e.g. about 1310 nm for standard SM-28 fiber, but can be different for other fibers) and taking advantage of the 4-th order dispersion parameter ($\beta_4$), photon pairs will be generated over a 1 THz of bandwidth at tunable wavelengths near 1550 and 1120 nm, respectively. Efficient phase-matching is then relatively insensitive to an emission frequency of the pump light source and tuning thereof may not be performed in order to obtain optimal pair generation rates. For instance, the design of fiber Bragg gratings is very flexible, allowing for good GVD matching of pump and frequency converted light. It is noted that too low pair generation rates may occasionally lead to the absence of a frequency-correlated photon pair for repeated use of the single-photon source. This would have a negative impact on the success rate and deterministic behavior of the single-photon source, e.g. the probability of producing at least output photon at an output of the single-photon source. Note that this bears similarity with the non-deterministic loss of a generated heralding or heralded photon in the single-photon source, e.g. optical coupling losses, absorption losses, scattering losses relative to generated heralding or heralded photon. Therefore, optical losses are sought to be minimized in preferred embodiments of the invention.

Above consideration in respect of the photon pair generation process in nonlinear waveguides, e.g. nonlinear optical fibers, microstructures fibers, or integrated waveguides, also apply to the process of optical frequency conversion, e.g. frequency up-conversion of the heralded photon. In particular, the large phase-matching bandwidths, e.g. phase-matching bandwidths as large as 10 THz or larger, over a wide range of pump frequencies, low optical losses, good conversion efficiency, and low optical background noise, too, are desirable properties of the frequency conversion means. In this regard, Bragg-scattering four-wave mixing (BS-FWM) has been shown to be a deterministic process that causes only very little background noise (e.g. stemming from competing optical nonlinearities such as Brillouin or Raman scattering) and reaches near-unity conversion in optical fibers. Background noise can be controlled by the choice of the pump laser wavelength, the length of the nonlinear waveguide, and/or by additional cooling of the waveguide. Moreover, non-degenerate four-wave mixing involving four photons facilitates the phase-matching (momentum conservation) over a wide optical bandwidth.

In embodiments of the invention in which a nonlinear waveguide or nonlinear crystal is inserted into an optical cavity, or in which a nonlinear waveguide or nonlinear crystal is configured as an optical resonator, a field enhancement effect can be obtained that makes the photon pair production even more efficient. Such a nonlinear cavity may be arranged to be singly resonant, e.g. for the light field associated with the pump pulse or one of the generated heralded and heralding photons, by can also be arranged to be doubly resonant, e.g. for the light field associated with the pump pulse and one of the generated heralded and heralding photons, or even triply resonant, e.g. with respect to all the light fields associated with the pump pulse, the generated heralded and the heralding photons. In these cavity-enhanced embodiments a linewidth of the pump pulse should is typically narrower than a linewidth of the cavity. Equivalently, the duration of the pump pulse is generally much longer than the cavity roundtrip time. It is noted that the field enhancement in the cavity occurs on a time scale of the pump (or photon pair) pulse and not on the time scale of the repetition time of the single-photon source. Besides, a frequency comb produced by a nonlinear cavity has the additional advantages that the individual frequency bins $\delta f_k$ composing the effectively available bandwidth $\Delta f_{MUX}$ for active multiplexing of heralded photons can be separated more easily in the spectral domain and that the mode matching (for indistinguishability) of output photons is more easily obtainable, as the modes are defined by the pair generation means (photon pair source), rather than by the rest of the setup.

Phase-matching may be achieved by known techniques in the art, including, without being limited thereto, quasi-phase-matching in periodically poled crystals or waveguides, non-critical phase-matching, and critical phase-matching in birefringent crystals. A crystal orientation relative to an angle of incidence for the pump light may be varied, the polarization of the pump light may be varied relative to an optical axis of a nonlinear crystal, a poling period and/or a crystal temperature may be adjusted. To this end, the single-photon source may further comprise one or more of rotatable mounts for nonlinear crystals or waveguides, rotation and/or translation stages to rotate and/or translate a nonlinear crystal or waveguide, polarization adjustment means, e.g. waveplates or fiberized polarization controllers, temperature control means (e.g. oven or Peltier element), beam angle steering means (e.g. pivotable mirrors) to adjust an angle of incidence of the pump light. For instance, a nonlinear crystal may be rotatably mounted with respect to incident pump light or may be mounted in a crystal oven. A periodically poled nonlinear crystal may comprise a fan-type poling structure so that a poling period can be continuously tuned by translation of the crystal. A plurality of periodically poled waveguides (e.g. integrated waveguides on-chip) which each have a different poling period may be provided on a same substrate such that coupling into a particular one of the plurality of waveguides yields the required poling period for quasi-phase-matching.

The single-photon spectrometer 12 is disposed in a light path of, and intercepts, the generated heralding photons. The single-photon spectrometer is adapted to generate a delayed output signal upon detection of an intercepted heralding photon. The delayed output signal is generated in such a way that a delay time $t_i$ of the output signal is indicative of the carrier frequency $f_i$ of the detected heralding photon. The frequency measurement performed on the detected heralding photon by the single-photon spectrometer 12 projects the corresponding heralded photon onto a pure state, e.g. having a center frequency $f_s=2c/\lambda_{p1}-c/\lambda_i$ as required by energy conservation in a degenerate four-wave mixing process or $f_s=c/\lambda_{p1}-c/\lambda_i$ in a spontaneous parametric down-conversion process, where c is the speed of light in vacuum and $f=c/\lambda$.

Notwithstanding the fact that multiple heralding photons may be intercepted subsequently, the spectrometer is responsive to only one among the intercepted heralding photons, generally the first one to arrive, and disregards all the subsequently arriving heralding photons that are intercepted during the spectrometer characteristic deadtime. Note that in a first-to-fire implementation of the single-photon spectrometer, fast decision electronics may select the first detection event out of a series of detection events with respect to multiple intercepted heralding photons and the delayed output signal is solely generated for the selected first detection event. The decision electronics are then reset to enable a further detection of a single intercepted heralding photon following a new trigger event of the single-photon source. Hence, even if the single-photon spectrometer may be capable of detecting a plurality intercepted heralding photons each time the single-photon source has been triggered (i.e. to deliver a single photon at its output on demand), only a single heralding photon detection event is accounted for.

In embodiments of the invention, the single-photon spectrometer 12 may comprise a dispersive member 121 and a photodetection means 122 coupled thereto. The dispersive member 121 disperses the intercepted heralding photons, spatially or temporally, according to their center frequency $f_i$ and the photodetection means 122 is arranged relative to the dispersive member such that the dispersed heralding photons are detectable in a frequency-resolved manner. According to some embodiments of the invention, a temporally dispersive member is coupled to a single-photon detector. The spread of arrival times of intercepted heralding photons by the temporally dispersive member can be understood as a frequency-to-time mapping for the center frequency $f_i$ of each detected heralding photon. Combining this mapping with the time-resolving measurement by the single-photon detector leads to a frequency-resolving measurement by the single-photon spectrometer 12.

A temporally dispersive member may be provided as a chirped fiber Bragg grating in transmission mode, a chirped fiber Bragg grating in reflection mode, coupled to a circulator, a dispersive optical waveguide (e.g. optical fiber, dispersion compensation fiber, or integrated waveguide on a PIC), or a Gires-Tournois interferometer (e.g. for nanosecond long photon durations). In preferred embodiments of the invention, a short (e.g. tens of centimeter long) chirped fiber Bragg grating is used as temporally dispersive member because it has a shorter latency and a better dispersion coefficient-to-optical loss ratio as compared to standard single-mode optical fibers or dispersion compensation fibers. The temporally dispersive member has a sufficiently strong group delay dispersion parameter GDD (e.g. in units of ps/nm) which permits to significantly spread in time the arrival times of the intercepted heralding photons on the photodetection means 122. The group delay dispersion parameter GDD corresponds to the product of group velocity dispersion parameter $D_\lambda$ (e.g. in units of ps/nm/km) and length L of the dispersive member. Here, a significant temporal spread of the arrival time of heralding photons, associated with different center wavelengths distributed over the interval for active multiplexing in the wavelength domain, $\Delta\lambda_{MUX}=[\lambda_{i,0}, \lambda_{i,m}]$, is achieved if $GDD*|\Delta\lambda_{MUX}|>t_{phot}$. Expressed in words, a significant temporal spread of the arrival time of heralding photons is achieved if the difference in group delays with respect to the heralding photons centered at each of the two end points $\lambda_{i,0}$, $\lambda_{i,m}$ of the interval for active multiplexing exceeds the time duration $t_{phot}$ of each one of the heralding photons. Here, the time duration $t_{phot}$ of each one of the heralding photons refers to the photon duration which is measured just behind the photon pair generation means 11 and which is typically close to the time duration $t_{in}$ of the pump light pulse. By way of example, a group delay dispersion parameter GDD of the dispersive member should be greater than 2.5 ps/nm for heralding photons of 100 ps duration and a 40 nm wide spectral range for actively multiplexed heralding photons. More preferably, one would like to identify a measured center frequency $f_i$ of the heralding photon with one of the m individual frequency bins $\delta f_1, \delta f_2, \ldots, \delta f_m$, which span the interval of actively multiplexed heralding photons and which can be used to model the photon pair generation process by means of an equivalent collection of m independent single-photon emitters. Describing the dispersion and detection process of heralding photons in terms of m equivalent single-photon emitters, the group delay dispersion parameter GDD of the dispersive member should be large enough to guarantee that the arrival time (i.e. delay $t_i$) of a dispersed and detected heralding photon can be correctly identified with one of the m frequency bins, e.g. the group delay dispersion parameter can be chosen such that GDD*$|\Delta\lambda_{MUX}|$>m*$t_{phot}$. From the previous example (100 ps long heralding photons, 40 nm wide multiplexing bandwidth) and assuming m=400 available frequency bins, one gets GDD>1000 ps/nm. In an even more accurate description, the generally negligible spectral broadening effect of the dispersive member on the more limited bandwidth of the heralding photons may also be taken into account. This and the finite operative bandwidth of the dispersive member limit the amount of equivalent single-photon emitters that can be theoretically fit into the optical bandwidth of a broadband optical pulse as used in the pulse shaper arrangement described hereinunder, e.g. $m_{max}<t_{phot}/T_{OP}$ with $T_{OP}$ being the FWHM coherence time of the broadband optical pulse, e.g. $m_{max}<1000$ for durations of 100 ps and 100 fs for the heralding photon and broadband pulse respectively. However, the effectively available number m of equivalent single-photon emitters can still be large, e.g. larger than 10, e.g. larger than 20, e.g. larger than 50, e.g. larger than 100, e.g. larger than 200, e.g. 400 or more. In practice GDD parameter values as large as 8000 ps$^2$ can indeed be obtained with chirped Bragg fiber gratings, e.g. in dispersion compensation modules, which have an operative optical bandwidth of up to 40 nm, approximately. The corresponding delay in arrival time with respect to heralding photons that have their center wavelengths spectrally separated by about 40 nm amounts to approximately 40 ns. The so dispersed heralding photons are then detected on a single photodetector adequate for single-photon detection, e.g. a (current-biased) superconducting nanowire or semiconductor avalanche photodiode, the latter being generally cheaper and easier to operate. Owing to their single-photon detection capability, the photodetector generates an electrical impulse, e.g. a TTL impulse, only for the dispersed heralding photon that is first received by the photodetector. Thereafter, the photodetector enters the deadtime and becomes blind to subsequent dispersed heralding photons. A timing accuracy of the photodetector, limited by timing jitter, may be as lower than 200 ps, e.g. as lower than 100 ps, e.g. lower than 20 ps. Preferably, the timing accuracy is comparable to, or smaller than, the heralding photon duration $t_{phot}$. Generally, the shape of the electrical impulse is not correlated with the duration of the dispersed heralding photon. However, the edge of the electrical impulse accurately represents, within a fixed amount of timing jitter, the arrival time $t_i$ of the detected, dispersed heralding photon and thus accurately indicates the center frequency $f_i$ of the detected heralding photon. The impulse edge time/arrival time $t_i$ is delayed with respect to a reference moment in time $t_0$, which may correspond to the time the single-photon source 10 received a trigger signal (e.g. trigger event to deliver a single output photon), or to the time the photodetector received a synchronization signal of the single-photon source 10 (e.g. generated by a synchronization circuit) in response to such a trigger event. The photodetector is reset before each new on-demand trigger event of the single-photon source 10 or the photodetector deadtime (e.g. a few nanoseconds) is shorter than a repetition rate of the single-photon source.

According to other embodiments of the invention, the single-photon spectrometer 12 comprises a spatially dispersive member is coupled to a plurality of single-photon detectors. The spatially dispersive member is adapted for directing each intercepted heralding photon to one of a plurality single-photon detectors arranged at different positions in space, according to a center frequency $f_i$ of that heralding photon. The plurality single-photon detectors are associated with a corresponding plurality of frequency channels such that each single-photon detector is responsive to heralding photons whose center frequency is located in the frequency channel associated with that single-photon detector. Hence, the single-photon spectrometer is adapted to resolve the center frequency of intercepted heralding photons by determining the corresponding frequency channel where it is detected. The frequency resolution is thus limited by the spectral width of each frequency channel and a bandwidth is limited by the number of frequency channels. Preferably, the spectral width of each frequency channel is comparable to or less than the optical bandwidth of the heralding photons, e.g. the Fourier-transform limited bandwidth of heralding photons of duration $t_{phot}$, and all frequency channels have the same latency, e.g. same propagation time of heralding photons towards the detector and same rise time. Channel-to-channel deviations in latency may be characterized and the results stored in a calibration table. More than one heralding photon may be detected by the plurality of single-photon detectors. Therefore, a decision unit of the spectrometer 12 contains fast decision electronics which are configured to select the first single photon that responded, e.g. after a period of deadtimes or after the reception of a trigger signal (e.g. trigger event to deliver a single output photon) or a synchronization signal by the single-photon source 10 at a reference moment in time to (e.g. generated by a synchronization circuit in response to such a trigger event). The decision unit is also configured to generate a delayed electrical output signal, e.g. TTL signal, a signal edge of which is delayed by an amount $t_i$ with respect to the reference time to such the delay is proportional to a number or center frequency of the selected frequency channel. A look-up table associating a time delay with a channel number may be accessed by the decision unit and a retrieved time delay may be supplied to a delay generator to generate the output signal with a signal edge aligned with the retrieved time delay. In such embodiments of the invention, the spatially dispersive member may be provided as an optical wavelength-demultiplexing member, e.g. a compact WDM module based on thin film filters, arrayed waveguide gratings or echelle gratings. Alternatively, the spatially dispersive member may comprise a diffraction grating, a pair of diffraction grating, a prism pair, a grism, a virtually imaged phase array (VIPA), or combinations thereof. The plurality of single-photon detectors may be arranged as an array and each of the single-photon detectors may be provided as a (current-biased) superconducting nanowire or semiconductor avalanche photodiode.

In preferred embodiments of the invention, a single-photon spectrometer with temporally dispersive member is provided because an intrinsic deadtime of the single-photon detector to which the dispersive member is coupled can be used to disregard subsequent heralding photons. This has the advantage that no fast decision electronics and delay synthesis for the delayed output signal are required.

The pulse shaper arrangement 13 is configured for receiving the delayed output signal generated by the spectrometer 12 and a broadband optical pulse. Furthermore, the pulse shaper arrangement 13 is configured for reshaping the received broadband pulse based on the received delayed output signal. A reshaped optical pulses delivered by the pulse shaper arrangement has a carrier frequency $f_{sel}$ which is selected to be substantially equal to the detected center frequency of an intercepted heralding photon, or which is selected to be substantially equal to the detected center frequency of an intercepted heralding photon plus a constant frequency shift, e.g. either $f_{sel}=f_i$ or $f_{sel}=f_i+f_{const}$. Besides, the reshaped optical pulse is preferably Fourier-transform-limited and, in order to ensure that the efficiency of translating the heralded photon center frequency $f_s$ to the source center frequency $f_{src}$ of the single output photon is close to unity, may have a temporal duration $t_{sel}$ that is substantially equal to the temporal duration $t_{phot}$ of generated heralded and heralding photons. However, according to different embodiments of the invention, the temporal duration $t_{sel}$ may be larger than the temporal duration $t_{phot}$ of generated heralded and heralding photons. The former has the advantage that no additional photons other than the heralded one are mistakenly converted into output photons of the single-photon source, e.g. a single-photon source of high purity is warranted. The latter has the advantage that a timing jitter with respect to the heralding photon detection time and derived delayed output signal has a reduced impact on the selected center frequency $f_{sel}$ of the reshaped pulse, i.e. the selected center frequency $f_{sel}$ of the reshaped pulse is less perturbed compared to the impact of timing jitter on the selected center frequency $f_{sel}$ of reshaped pulses for which $t_{sel} \approx t_{phot}$. This is beneficial for the indistinguishability of output photons generated by the single-photon source because less center frequency fluctuations relative to the reshaped pulse means less center frequency fluctuations for the output photon when frequency-converting the heralded photon into the output photon under the influence of the reshaped pulse.

In the following, an optical pulse is considered to be broadband if its optical bandwidth includes the effectively available bandwidth $\Delta f_{MUX}$ for active frequency-multiplexing of heralding photons. In other words, the spectral content of the optical broadband pulse contains each detectable center frequency of heralding photons intercepted by the single-photon spectrometer 12. Consequently, an acceptance bandwidth of the pulse shaper arrangement, too, is required to be at least as large as the effectively available bandwidth $\Delta f_{MUX}$ for active frequency-multiplexing of heralding photons. This requirement is automatically fulfilled if the available bandwidth $\Delta f_{MUX}$ for active frequency-multiplexing of heralding photons is limited by the acceptance bandwidth of the pulse shaper arrangement. Otherwise, a distinct optical component, e.g. an optical filter arrangement disposed in a light path of the heralding photons before they enter the spectrometer 12, is limiting the available bandwidth $\Delta f_{MUX}$ for active frequency-multiplexing of heralding photons such that it is comprised by the acceptance bandwidth of the pulse shaper arrangement. Such an intentional reduction in the available bandwidth $\Delta f_{MUX}$ has the advantage that the broadband noise related to the photon pair generation process is spectrally filtered and decreases in amplitude. Hence, irrelevant detection events due to noise, and further to heralded photons generated outside the useable frequency-multiplexing bandwidth, are largely prevented.

From the foregoing details it is apparent that the pulse shaper arrangement 13 is capable of producing a classical optical pulse at its output which has the same spectral and spatiotemporal properties as the previously detected heralding photon, or which corresponds to a frequency translated and/or temporally broadened classical version thereof. To achieve this practically, the pulse shaper arrangement 13 comprises a first dispersive element 131, a second dispersive element 133 and a pulse picking element 132 arranged between the first and second dispersive element 131, 133. The first dispersive element 131 is suitable for performing a frequency-to-time mapping of the launched broadband optical pulse, e.g. by inducing a dispersion-induced temporal broadening of the broadband optical pulse supplied to an input of the first dispersive element. In a dispersive medium, a chirp-free optical input pulse with slowly varying envelope $E_{in}$ and FWHM duration $T_{OP}$ evolves into a temporally broadened pulse $$E_{out}\left(t+\frac{L}{v_g}, L\right) = \exp\left(jC\frac{t^2}{2}\right)\sqrt{\frac{C}{2\pi j}} \int d\tau E_{in}(\tau, 0)\exp\left(jC\frac{\tau^2}{2}\right)\exp(jC\tau t).$$

Here, C is the linear frequency chirp rate (quadratically evolving phase profile) associated with the dispersive broadening (e.g. chromatic, geometric waveguide dispersion) effect acting on the input pulse and L is the length of the dispersive medium. The chirp rate C is connected to the group velocity dispersion parameter $GVD_\omega$ and the length L of the first dispersive element 131 by the relationship $C=(GVD_\omega L)^{-1}$. Higher-order dispersion effects have been neglected in the equation above. In the far-field limit for temporal dispersion, e.g. if $C^*T_{OP}^2 \ll 8\pi$, the quadratic phase factor in the integral can be neglected and the resulting propagated pulse is proportional to the Fourier-transform of its initial shape, e.g.

$$E_{out} \propto \exp\left(jC\frac{t^2}{2}\right)\mathcal{F}[E_{in}](\omega = Ct).$$

Therefore, the dispersive element 131 is suitable for performing a frequency-to-time mapping, also referred to as time dispersive Fourier transform, if the chirp rate C for the dispersion-induced broadening is small compared to the square of the optical bandwidth of the broadband optical pulse or, equivalently, if the length L of the dispersive element 131 is much longer than the characteristic dispersion length $L_D=T_{OP}^2/GVD_\omega$ of broadband optical pulses propagating along the dispersive element 131. In the equation above, the chirp rate C acts as a scaling factor which relates frequency components of the broadband optical pulse at the input of the dispersive element 131 to corresponding moments in time at which these frequency components reach the output of the dispersive element 131. It can be seen that the small magnitude of C entails a large separation in time even for frequency components of the broadband pulse that were initially close to each other, e.g. frequency components $f_k$, $f_{k+1}$ associated with adjacent frequency bins in the model of m independent single-photon emitters.

An input of the pulse picking element 132 is connected to the output of the dispersive element 131 so that the stretched, frequency-to-time mapped optical pulse is received by the pulse picking element. The pulse picking element 132 is configured to select the currently received frequency component of the frequency-to-time mapped optical pulse as the center frequency of a reshaped optical pulse at the moment the delayed output signal received by the pulse picking element, e.g. upon detection of a rising edge in the delayed output signal. A length and a dispersion parameter of the pulse picking element 132 are substantially smaller as compared to the first dispersive element 131. Hence, no further dispersive pulse broadening is induced by the pulse picking element 132 and the center frequency selection process for the reshaped pulse occurs quasi-instantaneously relative to the time scale of the broadened and frequency-to-time mapped optical pulse. Moreover, the pulse picking element 132 comprises amplitude modulation means for transmitting only a small portion of the frequency-to-time mapped optical pulse towards the second dispersive element 133, e.g. the transmitted portion is of much shorter duration as compared to the total duration of the frequency-to-time mapped optical pulse, e.g. a factor of m shorter, where m is the number of equivalent single-photon emitters/frequency bins. For instance, transmitted portions of the frequency-to-time mapped optical pulse may only last for about 100 ps, whereas the total duration of the frequency-to-time mapped optical pulse may be several tens of nanoseconds long. Consequently, the pulse picking element 132 is adapted to transmit only a narrow frequency band which is centered on the frequency component of the frequency-to-time mapped optical pulse corresponding to the arrival time of the delayed output signal at the pulse shaper arrangement. To avoid spectral broadening of the output photons in the subsequent frequency-conversion process, the spectral breadth of the transmitted narrow frequency band preferably is of the same order of magnitude as the optical bandwidth of the heralded photon wave packet, e.g. less than the spectral distance between two adjacent frequency bins, e.g. approximately equal to, or less than, the spectral width of a frequency bin. Non-limiting examples of the pulse picking element include electro-optical amplitude modulators and semiconductor optical amplifier modulators. For longer lasting reshaped pulses, e.g. about 10 ns and more, and longer lasting frequency-to-time mapped optical pulse, e.g. 100 ns and more, Bragg cells may be used as pulse picking element too.

The second dispersive element 133 is matched to the first dispersive element 131 such that a frequency chirp on the transmitted portion of the frequency-to-time mapped optical pulse is undone and an overall propagation delay (e.g. group delay) of the reshaped optical pulse at an output of the pulse shaper arrangement 13 is substantially independent of the selected center frequency $f_{sel}$ of the reshaped optical pulse. This matching may be achieved by configuring the second dispersive element 133 to have a chirp rate which is the negative of the chirp rate of the first dispersive element 131, e.g. $C_2=-C_1$, resulting a compound chirp rate $C_{PS}$ of the pulse shaper arrangement that is substantially zero, e.g. $C_{PS}=C_2+C_1=0$. The chirp rate of the first dispersive element 131 may be positive or negative. In particular embodiments of the invention, the second dispersive element 133 may have equal length L as the first dispersive element 131, but opposite group velocity dispersion $GVD_\omega$ as compared to the first dispersive element 131, e.g. $GVD_{\omega 2}=-GVD_{\omega 1}$. Non-limiting examples of the first and second dispersive element 131, 132 include standard single-mode fibers, dispersion compensating fibers, channelized arrayed waveguide gratings (and liquid crystal on silicon), fiber Bragg gratings or chirped fiber Bragg gratings, e.g. included in a compact dispersion compensating module (DCM). Preferably, the first and/or second dispersive element have a good dispersion-to-loss ratio, e.g. are provided as, or contain, a chirped fiber Bragg grating.

In embodiments of the invention in which the single-photon spectrometer 12 comprises a dispersive member 121 that is temporally dispersive, the group delay dispersion parameter for the first dispersive element 131 and that temporally dispersive member 121 are preferably of the same sign and magnitude. This has the advantage that a time delay $t_i$ of the time delayed output signal, generated by the spectrometer 12 in respect of an intercepted heralding photon with center frequency $f_i$, can be directly synchronized with a passage time (e.g. $2\pi f_i/C_1$) of that same frequency component $f_i$ of the frequency-to-time mapped broadband pulse at the pulse picking element 132. Direct synchronization of these two times may involve the step of providing an adequate delay for the broadband optical pulse before being launched into the pulse shaper arrangement 13 and/or for the electrical delayed output signal between the spectrometer 12 and the pulse shaper arrangement. An adequate delay for synchronization may be achieved, for example, by adjusting a tunable optical and/or electrical delay line. The synchronization needs to be performed only for one center frequency of the heralding photons and then automatically applies to all the other center frequencies, e.g. the synchronization is achieved in a way that does not depend on the particular value of the heralding photon center frequency. However, embodiments of the invention are not limited to a dispersive member 121 and a first dispersive element 131 that have matched group delay dispersion characteristics. A constant scaling factor which relates the group delay dispersion of the dispersive member 121 to the group delay dispersion of the first dispersive element 131 may be taken into account by a pulse delay generator of the single-photon spectrometer when generating the delayed output signal, e.g. the calculated delay time may be multiplied by the constant scaling factor.

The pulse shaper arrangement 13 may be optically coupled to a pulsed laser light source, e.g. a femtosecond mode-locked laser delivering short transform-limited optical pulses of duration $T_{OP}$ that are at least a factor of m shorter in comparison to the duration $t_{phot}$ of the heralded and heralding photons, i.e. $T_{OP} \leq t_{phot}/m$. This ensures that the spectral content of the broadband pulse covers all the heralding photon center frequencies available for frequency-multiplexing, e.g. the optical bandwidth of the broadband pulse overlaps the m frequency bins associated with the m independent single-photon emitters. For example, the pulsed laser source may be adapted for delivering 100 fs short, transform-limited optical pulses if heralded photons last for $t_{phot}=100$ ps and m is less than 1000. Conversely, the acceptance bandwidth of the pulse shaper arrangement should be larger than the optical bandwidth of the heralded photons by at least a factor m, i.e. $\Delta v_{PS} \geq \Delta v_{phot}*m$. Otherwise, some center frequencies of the reshaped pulse would be unattainable and the subsequent frequency conversion of the heralded photon into the single output photon at the targeted source center frequency would fail for the unattained center frequencies. For example, acceptance bandwidth of the pulse shaper arrangement should be about 1.1 THz or more, assuming 100 ps long, transform-limited sech$^2$ pulses for the heralding photons and m=500 equivalent single-photon emitters.

The optical frequency conversion means 14 is disposed in a light path of generated heralded photons. Furthermore, the frequency conversion means 14 is adapted to receive at least the reshaped optical pulse delivered by the pulse shaper arrangement 13, and optionally a further classical pulse of pump light, e.g. via an input facet (e.g. crystal facet or waveguide end facet) or an input coupler connected to a nonlinear waveguide, and is configured to induce an energy-conserving parametric frequency conversion process, in which the heralded photon in the pure state is annihilated and one output photon at the targeted source center frequency $f_{src}$ is created. A sum-frequency conversion process is inducible in a frequency conversion means 14 which comprises, or consists of, a nonlinear optical element (e.g. nonlinear crystal or waveguide) with quadratic nonlinearity. Alternatively, a non-degenerate or degenerate four-wave mixing process is inducible in a frequency conversion means 14 which comprises, or consists of, a nonlinear optical element (e.g. nonlinear crystal or waveguide) with cubic nonlinearity. As the parametric frequency conversion process is induced only if also momentum (k-vector) is conserved, configuration of the frequency conversion means 14 comprises fulfilling a phase-matching condition. The specific details on phase-matching and nonlinear optical materials that were previously presented with respect to the photon pair generation means 11 are applicable mutatis mutandis to the frequency conversion means 14.

A beam stop 15 may remove, attenuate or block the classical, reshaped optical pulse having passed the frequency conversion means 14. A narrowband spectral filter 16, e.g. having a passband that is slightly larger than the bandwidth $\delta f_k$ of individual frequency bins, e.g. a 1 nm wide passband, may be arranged in a light path of generated output photons to remove background noise and/or accidentally converted or non-converted heralded photons which may have been created in addition to the heralded photon for which a frequency of the corresponding heralding photon has been detected. The narrowband spectral filter 16 may help improving the purity of the single-photon source.

In embodiments of the invention, the single-photon source may further comprise an optical amplifier for optically amplifying the reshaped pulse delivered by the pulse shaper arrangement. This has the advantage that the efficiency of the nonlinear frequency conversion process that annihilates the heralded photon and creates the output photon may be strongly increased.

In embodiments of the invention, the single-photon source may further comprise a wavelength-sensitive optical attenuator which is configured to equalize the amplitude of the reshaped optical pulses delivered by the pulse shaper arrangement with respect to the various selectable center frequencies of the reshaped pulse. This has the advantage that the nonlinear frequency conversion process that annihilates the heralded photon and creates the output photon does not depend on the selected center frequency of the reshaped optical pulse. As a result the successful generation of output photons does not vary in time because heralded photons are effectively converted into output photons regardless of the detected center frequency of the heralding photon. Moreover, the indistinguishability of generated output photons is increased as a result of the amplitude equalization of the reshaped optical pulses.

In embodiments of the invention, light paths of the generated heralding and heralded photon may be separated by the nature of the conversion process, e.g. if correlated photon pairs are obtained in a non-collinear phase-matching condition, or may be separated by a suitable separation means, e.g. via a polarizing beam splitter for differently polarized heralded and heralding photons or via a wavelength-sensitive beam splitter (e.g. dichroic mirror or filter, wavelength division multiplexing module, arrayed waveguide grating, echelle grating, diffractive free-space grating, etc.).

In embodiments of the invention, the heralding and heralded photons may be routed between the individual components of the single-photon source, as well as between components of the single-photon source and an output of the single-photon source, by suitable light guiding means, including for example free-space optical elements such as mirrors and/or optical waveguiding means such as optical fiber or integrated waveguides of a PIC. Collection optics may be used to collimate and/or couple the generated heralded and/or heralding photons into optical waveguides. The heralded photon may be coupled to an optical delay means for temporally storing the heralded photon before the heralded photon is converted into the output photon. Optical delay means may include an optical delay line, recirculating loop or cavity.

In embodiments of the invention, a residual pump light may be filtered out by means of an optical passband filter after having passed through the photon pair generation means. No such filtering may be carried out in embodiments of the invention in which a propagation direction of the residual pump beam is not collinear with a propagation direction of the heralding photons, or else if the single-photon spectrometer is not sensitive to the wavelengths of the pump light.

Particular embodiments of the invention may be implemented as all-fiber or integrated optics solutions, e.g. on a photonic integrated circuit (PIC). This has the advantage that a compact, light-weighted and robust single-photon source can be obtained. Besides, optical coupling losses, which dominate the maximally achievable single-photon emission probability, may be further reduced, e.g. restricted to 1 dB or below.

Fiber-base implementations are particularly interesting with respect to their low optical propagation losses, enabling an efficient buffer mechanism for the heralded photon, the high frequency conversion efficiency, e.g. up to 95% or even more, and the attainable high success rate of mono-mode single-photon emission by the source, e.g. 80% or above. A photonic integrated solution, e.g. a PIC, on the other hand, offers the additional advantages of further reducing the size and cost of the single-photon source (less bulky and less expensive when mass-fabricated on wafer-scale), not relying as much on commercially available optical components, which allows for more flexibility in the choice of the deterministic source wavelength of the single-photon source, and the possibility to use single-photon detectors that do not necessarily require cryogenic cooling, thus making the deployment of the single-photon source outside a laboratory environment easier, e.g. operating at room temperature. Exemplary PIC-based implementations of the single-photon source may yield larger than 60% single-photon emission probability (success rate), e.g. higher than 80% single-photon emission probability, yield more than 90% indistinguishability (e.g. as characterized by the visibility in two-photon interferometer), operate at room temperature and with high repetition rate, e.g. 80 MHz or more.

Figure 2:
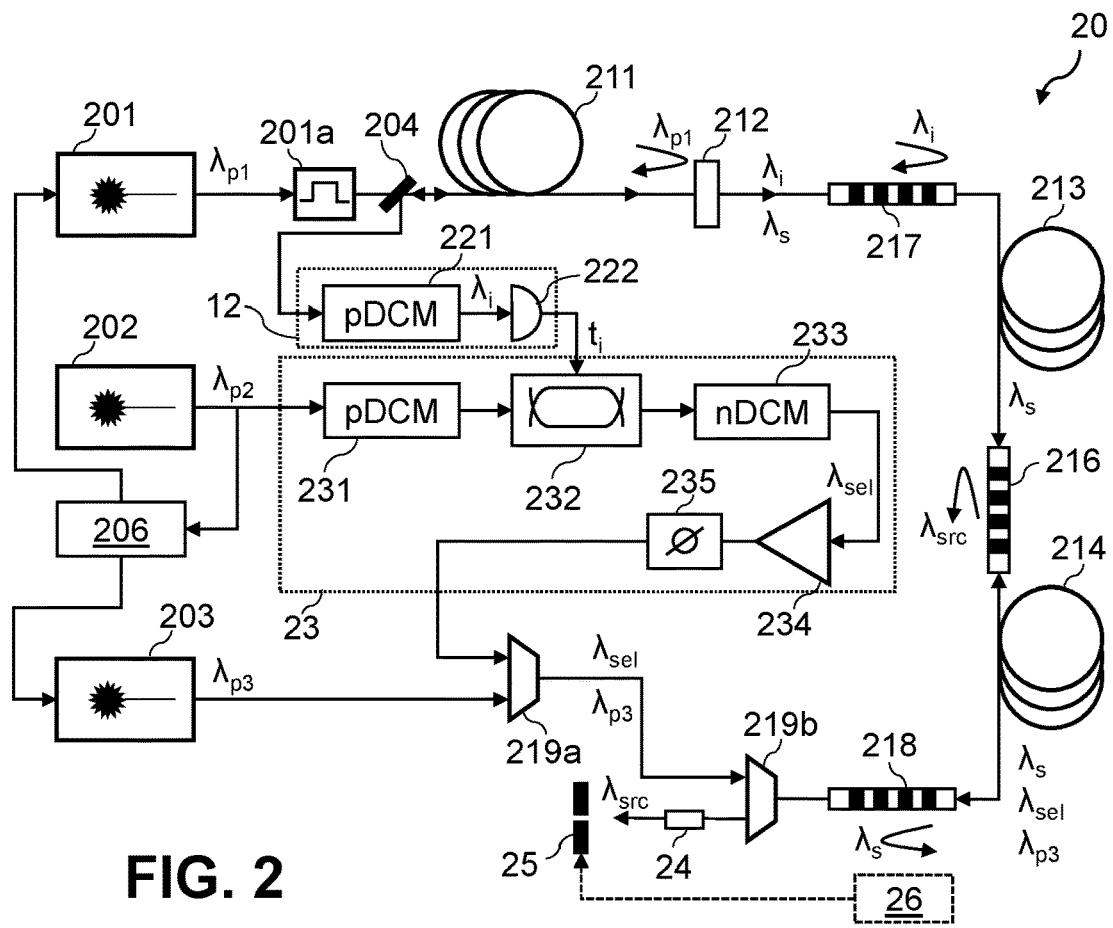
FIG. 2 shows a single-photon source according to embodiments of the invention, in which four-wave mixing processes in two third-order nonlinear media are used to generate correlated photon pairs and to up-convert heralded photons into output photons respectively.

Referring now to FIG. 2, an illustrative embodiment of a single-photon source according to the invention is shown in more detail. The single-photon source 20 comprises a pulse delay generator 206 which is triggered by the pulses of a regular pulse train supplied by a laser source 202, e.g. a mode-locked fiber laser. The pulse delay generator 206, when triggered, is configured to generate a plurality of electrical synchronization signals that are used to synchronize each one of the three light sources 201, 202, 203. The pulse delay generator may also send a synchronization signal to the single-photon detector 222 (or detector array in some embodiments of the invention) to provide the single-photon detector 222, and associated circuitry for the generation of the output signal, with a reference time and/or to reset the single-photon detector. The pulse delay generator may be triggered at an elevated rate, e.g. 1 MHz or more, e.g. 10 MHz, corresponding to the repetition rate of the photon source 20, e.g. the rate at which single output photons with a target center wavelength $\lambda_{src}$ are produced at the source output 24. An aperture 25 may be placed in front of the source output 24, which can be switched between an open and a closed state, e.g. by means of a mechanical shutter or an acousto-optic deflector. Hence, a continuous stream of single output photons can be blocked for as long as no external trigger signal is received by the aperture 25 and only if the external trigger signal is applied, the aperture is briefly switched to the open state to release a single output photon on demand. The external trigger signal may be supplied by a trigger signal generator 26, e.g. a push-button or switch of a user-interface of the photon source 20, or a trigger signal generator controlled by a processing unit executing a control program for the single-photon source 20.

A short piece (e.g. 30 cm long) of single-mode optical fiber 211, e.g. Corning HI 1060 high refractive index specialty fiber, is implementing the photon pair generation means of the single-photon source 20. The single-mode fiber 211 exhibits a third-order optical nonlinearity and is operable in a degenerate four-wave mixing process, in which two photons in the pump light of a pump laser 201, e.g. an actively mode-locked laser emitting pump light $\lambda_{p1}$ at about 1310 nm wavelength, are spontaneously converted into a frequency-correlated photon pair. Fiber technology is very mature and offers the benefit of very low optical losses. Moreover, the generation of photon pairs in fiber by virtue of a third-order nonlinear process, e.g. a degenerate four-wave mixing process, is well studied. Importantly, photon pairs can be generated over a very large optical bandwidth if the group velocity dispersion of the fiber vanishes at the wavelength of the pump laser (e.g. 1310 nm in this example), thereby increasing the effective number of frequency channels or bins available to the source for active frequency-multiplexing. It is another advantage of such fiber-based embodiments of the invention that the group velocity dispersion parameter, in particular the vanishing point thereof, can be controlled very well by design, fabrication and/or modification of the optical fiber.

The wavelengths of the photon pair take values in a continuum ranging from about 1.1 μm to about 1.6 μm. More specifically, the shorter wavelength photons may have wavelengths $\lambda_s$ in the range from 1126 nm to 1146 nm and are used as heralded photons. In contrast, the longer wavelength photons serve as heralding photons and may have corresponding wavelengths $\lambda_i$ in the range from 1528 nm to 1565 nm. In the present embodiment, the longer wavelength photons have been selected as heralding photons with center frequencies close to 1550 nm, because temporally dispersing them, e.g. in fiber Bragg gratings, is currently much easier in this wavelength than at shorter wavelengths. Embodiments are however not limited to this wavelength range, but may select heralding photons having shorter wavelengths, e.g. in the range 500 nm to 900 nm, at which single-photon detectors often show reduced dark counts and timing jitter, and better quantum efficiency. For instance, in embodiments of the invention that rely on the spatial dispersion of the heralding photons, these shorter wavelengths may present the preferred choice. A spectral filter or filter system 201a is connected to an output of the pump laser 201 in order to provide spectrally cleaner pump light pulses. One end of the single-mode fiber 211 is terminated by a first fiber Bragg grating 212 to remove residual pump light $\lambda_{p1}$ from the subsequent light path of the generated photon pair $\lambda_s$, $\lambda_i$. The residual pump light that is reflected back towards the pump laser 201 may be absorbed by an optical isolator (not shown), e.g. an optical isolator that is part of the pump laser 201. A second fiber Bragg grating 217 is provided in the light path of the generated photon pair $\lambda_s$, $\lambda_i$ and is configured to reflect generated heralding photons $\lambda_i$ and transmit generated heralded photons $\lambda_s$. For example, the second fiber Bragg grating 217 may have a center wavelength at 1550 nm and a reflection bandwidth larger than 40 nm. A dichroic filter 204 is used to separate the heralding photons $\lambda_i$ from the residual pump light $\lambda_{p1}$ and to direct generated heralding photons towards the dispersive member 221 of the single-photon spectrometer 22, e.g. a dispersion compensating module (DCM) including, e.g. a 10 m long, chirped fiber Bragg grating with positive group velocity dispersion that is capable of imparting a continuous delay of up to 50 ns between photons generated in the wavelength range from 1542 nm to 1565 nm (e.g. Proximion's Continuous Band Dispersion Compensation Module DCM-CB). Propagation along the DCM 221, an arrival time of the generated heralding photons at a single-photon detector 222 is spread as a function of the heralding photon center wavelength $\lambda_i$. The single-photon detector 222, e.g. a superconducting nanowire single-photon detector, is configured to generate an electrical output signal with a characteristic delay time $t_i$ upon detection of the dispersed heralding photon that arrives first. The delayed output signal is sent to the pulse picking element 232 of the pulse shaper arrangement 23, e.g. an electro-optic modulator with associated RF driving circuitry. The frequency measurement performed on the detected heralding photon by the single-photon spectrometer 22 projects the corresponding heralded photon onto a pure state, e.g. having a center frequency $f_s = 2c/\lambda_{p1} - c/\lambda_i$ as required by energy conservation in a degenerate four-wave mixing process.

Heralded photons are directed to a short spool of optical fiber 213, e.g. tens to hundreds or even up to thousands of meters long, which stores and imparts a time delay on the heralded photons so that the heralded photon in the pure state is synchronized with two classical light pulses with center wavelengths $\lambda_{p3}$, $\lambda_{sel}$ on its second pass through a strand of optical fiber 214 with third-order nonlinearity, such as, but not limited to, standard single mode optical fiber or specialty optical fiber (e.g. microstructured optical fiber, including large mode-area fibers). This time delay may be fine-tuned, e.g. by means of a fiber stretcher (not shown). A third fiber Bragg grating 216 is transmissive for the heralded photons and a first pass of the heralded photons through the fiber strand 214 leaves the heralded photons unaffected. A fourth fiber Bragg grating 218 is connected to an end portion of the nonlinear optical fiber 214 and is configured to reflect incident heralded photons back into the nonlinear optical fiber 214 so that they perform a second pass. The fourth fiber Bragg grating 218 may have a center wavelength at 1130 nm and a reflection bandwidth of at least 40 nm. An accurate synchronization (e.g. via synchronization pulses delivered by the pulse delay generator or other suitable means for clock signal generation) of the heralded photon in the pure state and the two classical pulses ensures that they overlap while propagating through the strand of nonlinear fiber 214 so that a single output photon with center wavelength $\lambda_{src}$ is created in a nonlinear frequency conversion process (e.g. parametric non-degenerate four-wave mixing process, which may be a Bragg scattering four-wave mixing process) with near-unity efficiency, e.g. about 90% or more, e.g. 95%. Conversion efficiency may be determined classically as the power ratio of frequency-converted light to incident light.

The third fiber Bragg grating 216 separates the single output photon from the residual classical light pulses by selectively reflecting back light in the vicinity of the targeted source center wavelength $\lambda_{src}$ only. For example, a center wavelength of the reflection band of the third fiber Bragg grating 216 may be located at 980 nm, coinciding with the targeted center wavelength of the output photon $\lambda_{src}$, and a bandwidth of that reflection band may be narrow, e.g. about 1 nm or less. Hence, the third fiber Bragg grating 216 also acts as an output filter of the single-photon source 20, which allows output photons at the targeted center wavelength $\lambda_{src}$ to propagate towards the source output 24 but prevents other photons from reaching the source output 24, e.g. output photons produced at different wavelengths than the targeted center wavelength $\lambda_{src}$. Such unwanted output photons may be due to the accidental conversion of additional heralded photons that have not been collapsed into a pure state, the spontaneous but less probable creation of new photon pairs in the nonlinear optical fiber 214 as a result of spontaneous four-wave mixing processes, or the less probable re-conversion of a generated output photon in a cascaded nonlinear process, and would show up as a weak background signal at the source output. Spectral filtering by the third fiber Bragg grating 216 thus helps achieving a single-photon source with improved purity.

Classical light pulses, centered at a wavelength $\lambda_{p3}$, originate from a third laser source 203, e.g. an actively mode-locked fiber laser emitting light pulses at about 1930±20 nm, e.g. 1950 nm, and are delivered to the nonlinear optical fiber 214 via a first and a second wavelength multiplexer 219a, 219b. Although embodiments of the invention can accommodate optical losses of up to 10 dB/km in the longer wavelength region where the classical light pulses are generated by the third laser source (e.g. 1900-1950 nm), standard single-mode fibers may not be appropriate for this wavelength range and exhibit excessive optical propagation losses. In alternative embodiments of the invention it is thus possible to use microstructured fibers, e.g. large mode-area fibers, for the delivery of the classical light pulse and the frequency conversion of the heralded photon (e.g. fiber strand 214 being provided as a piece of large mode-area fiber), which have lower optical propagation losses over broad wavelength range.

At the first wavelength multiplexer 219a, the classical light pulse provided by the third laser source 203 is combined with a further classical light pulse. This further classical light pulse corresponds to the reshaped optical pulse with selected center wavelength $\lambda_{sel}$ that is delivered by the pulse shaper arrangement of the single-photon source 20 and which is further amplified to a stronger intensity level by an optical amplifier 234. At the second wavelength multiplexer 219b, light of wavelengths associated with the two combined classical light pulses is separated from light of wavelengths associated with the generated and back-reflected (i.e. counterpropagating) output photon. The second wavelength multiplexer 219b thus also removes any partially back-reflected pump light ($\lambda_{p3}$ or/and $\lambda_{sel}$) from the source output 24. It is further noted that a second pass of partially back-reflected pump light ($\lambda_{p3}$ or/and $\lambda_{sel}$) through the nonlinear optical fiber 214 does not lead to a further creation of output photons in a nonlinear frequency conversion process, because this second pass is not synchronized with the heralded photon in the fiber 214.

The second laser source 202, e.g. a femtosecond passively mode-locked fiber laser emitting pulses at about 1550 nm, is connected to the first dispersive element 231 of the pulse shaper arrangement 23, e.g. a DCM with positive group velocity dispersion and identical specifications as the DCM used for the dispersive member 221 of the single-photon spectrometer 22. The first dispersive element 231 is adapted for inducing temporal broadening of light pulses emitted by the second laser source 202, based on dispersion. In particular, the first dispersive element 231 is adapted for mapping frequency components of the light pulse emitted by the second laser source 202 to corresponding moments in time at which said frequency components are subject to the modulating action of the pulse picking element 232, e.g. the classical pulse launched into the first dispersive element 231 is undergoing a dispersive Fourier transform if a length of the first dispersive element 231 is much longer than the characteristic dispersion length $L_D$ of the classical light pulse propagating inside the first dispersive element. Upon reception of the delayed output signal at delay time $t_i$, the RF driving circuitry of the pulse picking element 232 generates and applies a short electrical impulse to the amplitude modulator of the pulse picking element 232. The electrical impulse may be Gaussian shaped, a raised cosine waveform, etc., and has a temporal width that is equal to the duration of the generated heralded and heralding photons, or slightly longer. The modulator of the pulse picking element 232 is biased such that frequency components are not transmitted towards the second dispersive element 233 under operating conditions of the modulator where no electrical impulse is applied. In contrast, for operating conditions where the electrical impulse is being applied, an amplitude of the electrical impulse (e.g. the modulation depth) is such that the modulator switches to a state of maximal transmittance. Therefore, frequency components coincident with the electrical impulse are gated towards the second dispersive element 233. The center frequency of these selected frequency components of the broadband classical light pulse emitted by the second laser source 202 is substantially identical to the center frequency of the detected heralding photon, or is offset from the center frequency of the detected heralding photon by a constant amount. The second dispersive element 233 of the pulse shaper arrangement 23 has a group velocity dispersion that is of equal magnitude but opposite sign relative to the group velocity dispersion of the first dispersive element 231. For example, the second dispersive element 233 is provided as a DCM with negative group velocity dispersion and otherwise identical specifications as the DCM used for the first dispersive element 231. This choice of dispersion properties of the second dispersive element 233 in relation to the first dispersive element 231 ensures that the overall group delay of a reshaped optical pulse delivered by the pulse shaper arrangement 23 is independent of the selected center wavelength $\lambda_{sel}$ of the reshaped pulse and that a residual amount of frequency chirp on the reshaped optical pulse is de facto removed. It is to be noted that the reshaped optical pulse is narrowband as compared to the broadband optical pulse launched into the pulse shaper arrangement 23 and hence no substantial temporal broadening occurs while the reshaped optical pulses travels along the second dispersive element 233, resulting in nearly transform-limited reshaped optical pulses at an output of the pulse shaper arrangement 23. A small amount of temporal pulse broadening may happen in the amplifier 234, e.g. a doped fiber amplifier such as an Erbium-doped fiber amplifier, which may have a non-flat gain spectrum. The amplifier 234 boosts the peak power of the reshaped optical pulse to a level that is adequate for the subsequent frequency up-conversion process in the nonlinear optical fiber 214, which converts the pure-state heralded photon into the output photon at the targeted center wavelength $\lambda_{src}$. In preferred embodiment of the invention, the gain spectrum of the amplifier is flat over the continuous wavelength range of generated heralding photons and broadband pulses delivered by the laser source 202 are flat-top pulses. This has the advantage that no amplitude equalization is needed with respect to reshaped optical pulses centered at various frequencies. Alternatively, as shown in the embodiment of FIG. 2, the pulse shaper arrangement 23 may include a variable optical attenuator 235 which is configured for equaling an amplitude of the reshaped optical pulses across all selectable center wavelengths $\lambda_{sel}$. Such a variable optical attenuator 235 may comprise or consist of a programmable spectral filter, e.g. integrated photonic tunable filter, or a grating coupled to a spatial light modulator operated in reflection mode.

The present invention also relates to a method for generating single photons. The method comprises at least the following steps:

generating a narrowband heralding and heralded photon in a frequency-correlated photon pair, using a nonlinear optical process, so that a frequency $f_i$ of the heralding photon in each photon pair is randomly distributed over an available bandwidth for active frequency-multiplexing of heralding photons $\Delta f_{MUX}$ and a frequency $f_s$ of the heralded photon in each photon pair is determined by the frequency $f_i$ of the heralding photon generated in that same pair, detecting the frequency $f_i$ of the heralding photon, providing a broadband optical pulse whose spectral bandwidth includes said available bandwidth for active frequency-multiplexing of heralding photons $\Delta f_{MUX}$, forming a reshaped optical pulse by selecting only frequency components $f_{sel}$ of the broadband pulse that substantially coincide with the frequency of the detected heralding photon, or with a constant frequency detuning thereof, converting the heralded photon corresponding to the detected heralding photon into a single output photon with deterministic frequency $f_{src}$, by combing said heralded photon with said reshaped optical pulse in a nonlinear optical medium.

The method may comprise various additional steps as will be appreciated by the skilled person carrying out the invention, using the single-photon source of the embodiment referred to in FIG. 2. Such additional steps may comprise: generating a output signal indicative of the center frequency $f_i$ of the detected heralding photon, e.g. a delayed output signal having with an adjustable delay time $t_i$ representative of the frequency $f_i$ of the detected heralding photon, performing a frequency-to-time mapping, a frequency-to-space mapping, or a combination of a frequency-to-time mapping and a frequency-to-space mapping of a broadband optical pulse having a spectral bandwidth including said available bandwidth for active multiplexing of heralding photons, optionally, compensating an overall group delay dispersion in respect of reshaped optical pulses of different selected frequency components $f_{sel}$, and/or amplifying said reshaped optical pulse prior to the step of converting the heralded photon into the single output photon.

In use, the single-photon source 20 delivers single output photons on demand. The single output photons are one-photon wave packets with source center wavelength $\lambda_{src}$. This source center wavelength may be fixed or may be tunable. An exemplary mode of operation of a single-photon source 20 with source center frequency tuning capability includes adding a constant offset delay to the delayed output signal produced by the single-photon spectrometer 22, resulting in a constant frequency offset of the reshaped pulse with respect to the center frequency of the detected heralding photon. The constant frequency offset of the reshaped pulse, in turn, leads to a corresponding frequency shift in the upconverted output photon at the source output 24. The reflection bandwidth requirements of the third fiber Bragg grating 216 are adapted accordingly. Alternatively, the constant offset delay may be added to the delayed output signal when it is received by the pulse shaper arrangement 23. For instance, the constant offset delay may be added at the moment the RF driving circuitry associated with the pulse picking element 232 is generating the electrical impulse for driving the modulator into a state of maximal transmittance. The same effect of frequency-tunable output photons is obtained.

Preferably, the single output photons are generated as Fourier-transform limited one-photon wave packets. Their spectral bandwidth (linewidth) may about 3 GHz for a respective output photon duration of 100 ps, assuming a sech$^2$ temporal mode shape, or about 15 GHz for 70 ps long wave packets. The spatial mode of the delivered output photons may be that of a single-mode optical fiber and a (source) center wavelength of the output photons may be about 980 nm. However, various other output photon durations and source center wavelengths may be realized in other embodiments of the invention, e.g. a source center wavelength for the single output photons may vary in the range of 400 nm to 2 μm. Output photons are preferably indistinguishable, i.e. identical polarization, spatiotemporal mode structure and frequency, so that the single-photon source provides a useful resource for quantum experiments, quantum sensing, quantum imaging, quantum computation (e.g. linear optical quantum computing and boson sampling), quantum cryptography (e.g. quantum key distribution) or quantum telecommunication applications, which rely on the principle of photon indistinguishability. The photon indistinguishability can be assessed by measuring the Hong-Ou-Mandel effect in a two-photon interferometer and an associated visibility may be at least 80%.

The on-demand single output photon creation process by the source 20 may be triggered via an externally generated electrical trigger signal, e.g. a trigger signal generated by an external trigger signal generator 26 representative of a computer (program) or a push-button event initiated by the user, etc. This external trigger signal may be applied to a switchable aperture 25, which in response briefly switches into a non-blocking state so that a single output photon is released by the source 20. A stream of single output photons may be generated at a repetition rate of the single-photon source 20, e.g. at 1 MHz or adjustable in the range from 1-10 MHz, but blocked by the closed aperture 25 as long as no demand of a single output photon has been made externally. To achieve this the second laser source is implemented as a passively mode-locked femtosecond laser, which provides a stable train of femtosecond output pulses, e.g. 100 fs long bandwidth-limited pulses, acting as a passive clock. A fraction of the optical power contained in these pulses is split off and detected by a pulse delay generator 206. Multiple electrical synchronization signals are generated by the pulse delay generator 206 upon detection of the passive clock and sent to the first and second light source 201, 203, and optionally also to the single-photon spectrometer 22. The delay of the synchronization signals is set such that the heralded photon temporally overlaps at least with the reshaped optical pulse delivered by the pulse shaper arrangement during the frequency up-conversion process in the optical frequency conversion means. In the embodiment of FIG. 2, another classical pump pulse is supplied to the optical frequency conversion means, e.g. the nonlinear optical fiber 214, which is operated in a phase-matched condition for non-degenerate four-wave mixing. Consequently, this further classical pump pulse also has to temporally overlap the heralded photon in the nonlinear optical fiber 214 and a delay of the synchronization signals for the third light source 203 is set accordingly. A synchronization signal may be delivered to the single-photon spectrometer 22 to reset the single-photon detector(s) and/or to provide a reference time to the output signal generating circuitry associated with the single-photon spectrometer.

The first light source 201 generates an intense classical light pulse, e.g. a 100 ps long, bandwidth-limited optical pulse centered between 1240 nm and 1340 nm, e.g. at about 1310 nm, each time it is triggered by the periodic synchronization signal. The light pulse generated by the first light source 201 is coupled into the photon pair generation means, e.g. the nonlinear optical fiber 211, which may have a length of approximately 5 m and which is operated in a phase-matched condition for spontaneous degenerate four-wave mixing. A temporal profile and duration of the light pulse provided by the first light source 201 may be adjusted to create at least one frequency-correlated photon pair in the nonlinear optical fiber 211 such that the generated heralding photon of the so created pair is located within the effectively available bandwidth $\Delta f_{MUX}$ for active multiplexing of heralding photons, e.g. located in one of the m equivalent frequency bins. The residual pump light is removed from the light paths of the generated heralding and heralded photon, e.g. via the fiber Bragg grating 212 and the dichroic filter 204.

Then the light paths of the generated heralding and heralded photon are separated, e.g. via the fiber Bragg grating 217, and the heralding photon is directed to the single-photon spectrometer 22, e.g. via the dichroic filter 204. The heralded photon is delayed, e.g. by storing it in a fiber spool 213, before being supplied to the frequency conversion means, e.g. the nonlinear optical fiber 214. Meanwhile, the single-photon spectrometer 22 performs a frequency measurement on the first intercepted heralded photon to which the single-photon detector 222 responds, e.g. by first delaying an arrival time of the intercepted heralding photons on the detector 222 by an amount that is correlated (linearly to first order) with the center frequency of the heralding photon that is subsequently detected by the detector 222. The heralded photon corresponding to the detected heralding photon is projected into a pure state, i.e. having a well-defined center frequency with respect to the collection of m frequency bins. Furthermore, the single-photon spectrometer 22 produces a delayed output signal for which a time delay is indicative of the measured heralding photon center frequency. This delayed output signal is applied to the pulse picking element 232 of the pulse shaper arrangement 23. A bandpass filter (not shown) may be inserted before the detector 222 to further reduce the detector noise, which is attributed to light backpropagating through the system and outside the optical bandwidth $\Delta f_{MUX}$ for active multiplexing of heralding photons.

The second light source 202 generates an intense and broadband classical light pulse, e.g. a 100 fs short bandwidth-limited optical pulse centered at about 1550 nm, each time it is triggered by the periodic synchronization signal. The light pulse generated by the second light source 202 is coupled into the first dispersive element 231 of the pulse shaper arrangement 23, e.g. the dispersion compensating module (DCM), which is configured to map frequency components of the received broadband pulse onto corresponding moments in time, e.g. the moments in time the respective frequency components are subject to amplitude modulation by the pulse picking element 232. It has been demonstrated that for a sufficiently dispersive element 231, the received broadband optical pulse undergoes a dispersive Fourier transform when propagated to the output of the first dispersive element 231. The pulse picking element is actuated by the delayed output signal so that only a narrowband portion of the frequency-to-time mapped broadband pulse is transmitted towards the input of the second dispersive element 233. The pulse shaper arrangement 23 and the single-photon spectrometer 22 are synchronized in such a way that the center frequency of the detected heralding photon of which the time delay of the delayed output signal is indicative substantially coincides with the center frequency of the transmitted narrowband portion of the frequency-to-time mapped broadband pulse. A temporal duration of the transmitted narrowband portion may be substantially equal to the duration of the heralded photon, e.g. about 100 ps. Reshaping of the optical pulse is completed after the transmitted narrowband pulse has propagated to the output of the second dispersive element 233, amplified, e.g. by the optical amplifier 234, and equalized in amplitude, e.g. by the wavelength-sensitive variable optical attenuator 235. Propagation of the transmitted narrowband pulse through the second dispersive element 233 removes the remaining frequency chirp on the transmitted pulse and compensates for group delay differences across the frequency interval for active multiplexing of heralding photons. This is achieved, for instance, by selecting the group velocity dispersion parameter of the second dispersive element 233 to be opposite to the group velocity dispersion parameter of the first dispersive element 231 and by selecting an equal length for the first and second dispersive element 231, 233. The reshaped pulse is then directed towards the frequency conversion means, e.g. the nonlinear optical fiber 214.

The third light source 203 generates an intense classical light pulse, e.g. a 100 ps long, bandwidth-limited optical pulse centered at about 1950 nm, each time it is triggered by the periodic synchronization signal. The light pulse generated by the third light source 203 is coupled into the frequency conversion means, e.g. the nonlinear optical fiber 214, which is operated in a phase-matched condition for non-degenerate four-wave mixing. There, the light pulse generated by the third light source 203 is overlapped in time with the reshaped optical pulse provided by the pulse shaper arrangement 23 as well as with the delayed heralded photon to produce a single output photon, e.g. at 980 nm center wavelength, by up-conversion of the heralded photon. During this up-conversion process the two classical pulses exchange energy so that energy is conserved at the end of the process. A temporal profile and duration of the light pulse provided by the third light source 203 may be adjusted to improve the efficiency of the up-conversion process and/or to improve the indistinguishable character of the generated output photons. Thereafter, the output photon is directed to the source output 24. In the present embodiment, the third light source may be modified to generate an intense CW beam at about 1950 nm. This applies generally to embodiments which use a non-degenerate four-wave mixing process to generate the frequency-converted output photons and for which a fourth light field is supplied in addition to a light pulse and a single photon.

In the above-described embodiment all three light sources 201, 202 and 203 may be tunable light sources. Wavelength tunability of the light sources may be advantageous for accommodating the exact dispersive properties of the nonlinear optical fibers 211, 214 used for nonlinear frequency conversion processes, e.g. for tuning the pump light delivered by one or both of the first and third light source 201, 203 into the vicinity of the point of vanishing group velocity dispersion for the respective the nonlinear optical fibers 211, 214 in order to increase a phase matching bandwidth of the underlying parametric frequency conversion process, or to match an emitted center wavelength of the second light source with the center wavelength of transmission window of the DCMs used in the pulse shaper arrangement in order to minimize optical losses. Moreover, a temporal shape and the duration of the light pulses generated by each of the three light sources 201, 202 and 203 may be adjustable. The temporal shape and the duration of the light pulses have an influence on the obtainable number m of equivalent single-photon emitters/frequency bins and hence on the success rate of the single-photon source. They also have an impact on the indistinguishability of the output photons produced by the single-photon source. Hence, an adjustable temporal shape and duration of the light pulses is beneficial for the control of the success rate and indistinguishability property of the single-photon source. Preferably, the generated light pulses are Fourier transform-limited. The first and third light source may be provided as continuous laser light sources in alternative embodiments of the invention. In such alternative embodiments, the cw laser light emitted by these sources is subject to amplitude modulation. In particular, amplitude modulation may be performed periodically at the repetition rate of the single-photon source, e.g. triggered by a pulse delay generator or other suitable synchronization means, and a duty cycle of the amplitude modulation may be set equal to the sought duration of the heralded and heralding photons.

In variants of the above-described embodiment, the first and second light source may be provided as a single light source for which an output light is split by suitable optical splitters. For instance, a single light source may be used to provide pump light to the photon pair generation means and the frequency conversion means of the single-photon source. The provided pump light enables photon pair generation by spontaneous parametric down-conversion in a nonlinear optical medium with quadratic nonlinearity (e.g. nonlinear crystal, integrated waveguide or periodically poled fiber) and sum-frequency conversion in the same or a further nonlinear optical medium with quadratic nonlinearity. Hence, in accordance with particular embodiments of the invention, a single nonlinear optical element may be provided for both the photon pair generation means and the frequency conversion means.

Furthermore, the amplification stage 234 and/or the equalization stage 235 are optional stages of the single-photon transducer, e.g. optional stages of the pulse shaper arrangement 23, which can be applied similarly in other embodiments of the invention. The order of the second dispersive element of the pulse shaper, the amplification stage, and the equalization stage, as encountered by the optical pulse during reshaping, may vary in other or same embodiments of the invention. For example, the optical pulse undergoing reshaping may first traverse the equalization stage, followed by the second dispersive element of the pulse shaper and only thereafter pass through the amplification stage. Additionally, a pre-amplification stage (e.g. an optical pre-amplifier) may be inserted into the light path of the optical pulse undergoing reshaping, prior to its pass through the second dispersive element of the pulse shaper and through the (main) amplification stage.

An equalization stage is preferred in embodiments of the invention, in which the broadband optical pulse to be reshaped is emitted with a rather complex spectral shape, e.g. displaying significant wings or side modes, as this leads to a wavelength-dependent intensity profile of the spectrally narrower pulse after reshaping. Optical pulses with a complex spectral shape are frequently encountered in fs-pulsed laser sources, which can be used in embodiments of the invention to generate the broadband optical pulse to be launched into the pulse shaper arrangement. This dependence of the reshaped, narrowband optical pulse intensity on wavelength can be removed at the pulse shaper output by the equalization stage. This equalization stage may be conceived as a programable spectral attenuator. It may comprise a pair of diffraction gratings acting as a wavelength demultiplexer-multiplexer-pair, a programmable spatial light modulator (SLM) that provides for the wavelength-specific equalization of the pulse amplitude, and a collimator pair at the input and output side of the equalization stage. A phase-only SLM may be arranged between a half-wave plate and a polarizer to obtain amplitude operation. The spectral attenuator can also compensate for other sources of wavelength-dependent loss or gain, further down the optical path of the optical pulse undergoing reshaping, e.g. one or more of pre-amplification stage, amplification stage, second dispersive element of the pulse shaper.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Figure 3:
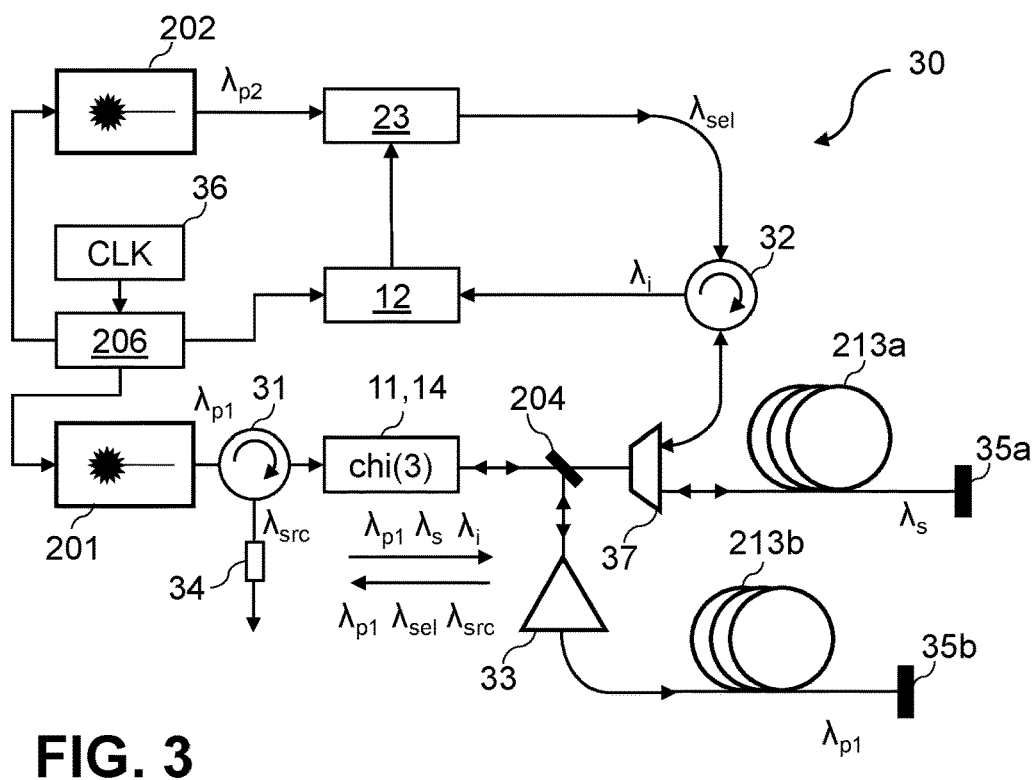
FIG. 3 shows a single-photon source according to another embodiments of the invention, in which a single nonlinear medium is used to both generate correlated photon pairs and up-convert heralded photons into output photons.

FIG. 3 shows an alternative embodiment of the invention. Same reference signs designate same components in the embodiments of FIG. 2 and FIG. 3. The single-photon source 30 of FIG. 3 uses an external trigger signal generator 36, e.g. an external clock CLK, to enable synchronization of the light sources 201, 202 and the single-photon spectrometer 22 via a synchronization circuit 206, e.g. a pulse delay generator. The single-photon source 30 only uses one light source 201 to provide classical light pulses of pump light $\lambda_{p1}$ as inputs to the nonlinear optical process underlying the photon pair generation and the frequency conversion step, converting heralded photons into output photons. This is achieved in the present embodiment by providing a single nonlinear element chi(3), comprising a nonlinear optical medium with cubic nonlinearity, which acts both as photon pair generation means 11 and frequency conversion means 14. In addition thereto, a residual pump pulse is redirected into the nonlinear element chi(3) after having performed a first pass therethrough. Redirecting of the residual pump pulse may involve delaying the residual pump pulse in an optical delay line 213b, e.g. a fiber spool, and reflecting the residual pump pulse at a reflector 35b terminating the delay line 213b. Besides, an optical amplifier 33 may be provided to restore an amplitude of the residual pump pulse to its original level before performing a second pass through the nonlinear element chi(3). Recycling the pump pulse delivered by the first light source 201 and letting it pass twice through the nonlinear element chi(3) allows one to remove the third light source.

During its first pass through the nonlinear element chi(3), heralded and heralding photons $\lambda_s$, $\lambda_i$ are generated in the nonlinear element chi(3), which is configured to operate in a phase-matched condition of a spontaneous degenerate four-wave mixing process. A dichroic filter 204 is used to separate the residual pump pulse from the light path of the heralded and heralding photons. A subsequent wavelength-demultiplexer 37 separates a light path of the heralding photons from a light path of the heralded photons. The heralded photons are delayed in an optical delay line 213a, e.g. a fiber spool, and reflecting by a reflector 35a terminating the delay line 213a. Consequently, a delayed heralded photon, which has been projected onto a pure state by a frequency-resolving measurement of the corresponding heralding photon by the spectrometer 22, is re-entering the nonlinear element chi(3) via the wavelength-demultiplexer 37. An appropriate choice of the delays imparted to the heralded photon and the residual pump pulse by the delay lines 213a, 213b enable a temporal overlap of the heralded photon and the residual pump pulse while propagating through the nonlinear element chi(3). Likewise, a broadband optical pulse is delivered by the synchronized second light source 202 in such a way that the resulting reshaped optical pulse with center wavelength $\lambda_{sel}$, leaving the pulse shaper arrangement 23, also temporally overlaps with the heralded photon and the residual pump pulse while propagating through the nonlinear element chi(3). Therefore, a single output photon at targeted source center wavelength $\lambda_{src}$ is generated during the second pass of the recycled pump pulse through the nonlinear element chi(3), which is again configured to operate in a phase-matched condition of a degenerate four-wave mixing process.

A first circulator 31 is configured to redirect a generated output photon towards the source output 34. Additional spectral filtering means (not shown) may be provided between the first circulator 31 and the source output 34 to remove the remaining pump light after the second pass through the nonlinear element chi(3). A second circulator 32 is provided to direct heralding photons, which are generated at the first pass of the pump pulse through the nonlinear element chi(3), towards the single-photon spectrometer 22 and to inject the reshaped optical pulses into the nonlinear element chi(3) such that they propagate along the same direction as the recycled pump pulse during its second pass through the nonlinear element chi(3).

It is further noted that embodiments of the invention can be implemented with a single laser light source. For example, the single laser light source may be configured to deliver the broadband optical pulse, e.g. about 100 fs long, and a beam splitter may be provided to divide the broadband optical pulse. A first portion of the divided broadband pulse is then directed to spectral filter, e.g. reconfigurable wavelength filter or bandpass filter, to carve out one or more bandwidth limited pulses, e.g. about 100 ps long, which otherwise would have been provided by the supplementary laser source(s). The carved out pulse(s) may be re-amplified. At least one carved out pulse is then directed to the photon pair generation means. Moreover, a second portion of the divided broadband pulse may be re-amplified and is sent to the pulse shaper arrangement.

Figure 5:
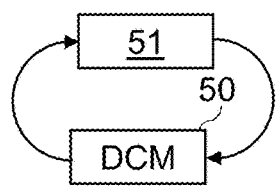
FIG. 5 illustrates how an effective length of a dispersive optical component, which can be used in embodiments of the invention, is increased.

FIG. 5 illustrates how an effective length of a dispersive optical component 50, e.g. the dispersive member 121, 221 of the single-photon spectrometer and/or the dispersive element 131, 231, 133, 233 of the pulse shaper arrangement, can be increased in alternative embodiments of the inventions. An increased effective length of the dispersive optical component 50 may have the advantage that a group velocity dispersion parameter of the dispersive optical component 50 can be reduced without altering an absolute amount of group delay. Alternatively, the absolute amount of group delay can be increased for a given group velocity dispersion parameter of the dispersive optical component 50 when compared to a single-pass configuration.

FIG. 5 shows an arrangement in which optical pulses, e.g. heralding photon or broadband optical pulse, are capable of performing multiple passes through the dispersive component 50, e.g. a DCM. This is achieved by arranging the dispersive component 50 inside a recirculating loop, which also contains an optical switch 51, e.g. a 2×2 Mach Zehnder interferometer based switch or an acousto-optical deflector, for coupling a received optical pulse into the loop and a dispersed optical pulse out of the loop. As long as the optical switch 51 is operated in a closed state where the optical pulse is coupled back into the loop, the optical pulse is repeatedly undergoing dispersive broadening. After a predetermined number of passes, corresponding to the necessary amount of pulse broadening or group delay dispersion, the optical switch 51 is operated in an open state where the optical pulse is deflected out of the loop.

Figure 6:
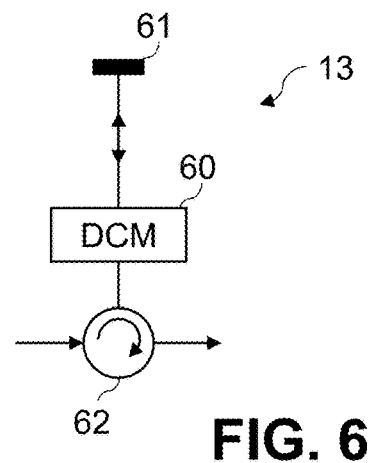
FIG. 6 shows an alternative pulse shaper arrangement, which can be used in embodiments of the invention to reduce the number of dispersive elements.

Referring to FIG. 6, an alternative pulse shaper arrangement 13 is shown, which can be used in embodiments of the invention to reduce the number of dispersive elements contained therein. In the pulse shaper arrangement 13, a single dispersive element 60 (e.g. DCM) is arranged between a reflection modulator 61 and a circulator 62 such that a dispersed and frequency-to-time mapped broadband optical pulse produced by the dispersive element 60 after a first pass therethrough is redirected to the dispersive element 60 to perform a second pass therethrough. The reflection modulator 61 is adapted to reflect incident light when a control or driver signal is applied and to transmit and/or absorb incident light otherwise. In other words, the modulator 61 is conditionally reflective, wherein a reflective state of the modulator is inducible by application of a control or driver signal. The reflection modulator 61 may be provided as a saturable absorber mirror (SAM), e.g. a semiconductor SAM, which is switched from an absorbing state to a reflective state upon application of an electrical driving signal or upon injection of an optical control signal. Alternatively, the reflection modulator may be provided as an integrated device that includes an electro-optic modulator with broadband Bragg reflector termination, an electro-absorption modulator with reflective rear substrate, or an electro-optic Bragg modulator (induced phase grating). For longer photon durations $t_{phot}$, the reflection modulator may be implemented as a digital micromirror device, grating light valve, MEMS-based deformable mirror, or phase-change material comprising dielectric layer stacks. In yet alternative embodiments, the reflection modulator may be provided as two or more separate devices, e.g. an amplitude modulator in combination with a mirror or a phase modulator (e.g. Pockels cell) in combination with polarizers and a mirror. Moreover, a chirp rate of the dispersive element 60, e.g. chirped fiber Bragg grating or DCM, is asymmetric with respect to the propagation direction of light through it: the chirp rate for the first pass (forward direction), $C_+$, is opposite to the chirp rate for the second pass (backward direction), $C_-$, i.e. $C_+ = -C_-$. Having completed a second pass through the dispersive element 60, the reshaped optical pulse is directed to an output of the pulse shaper arrangement via the circulator 62.

Figure 7:
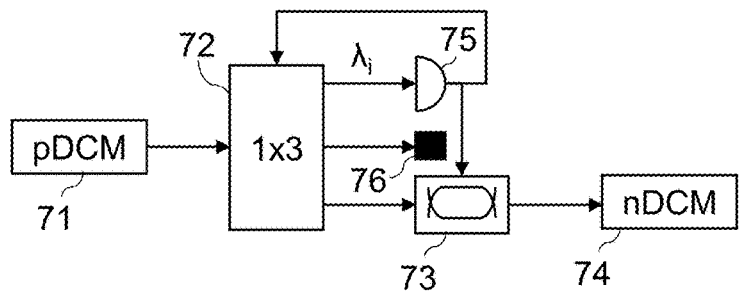
FIG. 7 illustrates how the pulse shaper arrangement and the single-photon spectrometer can be arranged in embodiments of the invention so that they share a temporally dispersive element.

FIG. 7 illustrates how the pulse shaper arrangement and the single-photon spectrometer can be arranged in embodiments of the invention so that they share a temporally dispersive element. This has the advantage that the amount of group delay dispersion is the same for the frequency-distribution of actively multiplexed heralding photons intercepted by the single-photon spectrometer and broadband optical pulses injected into the pulse shaper arrangement, simplifying the synchronization of the pulse shaper arrangement and the single-photon spectrometer. In the present example, the dispersive element 71 (e.g. DCM or chirped finer Bragg grating) is shared between the single-photon spectrometer, which also includes the single-photon detector 75, and the pulse shaper arrangement, which further includes an amplitude modulator 73 and another temporally dispersive element 74 (e.g. DCM or chirped finer Bragg grating). The second dispersive element 74 is arranged relative to the first dispersive element 71 such that its chirp rate is opposite to that of the first dispersive element 71 for light pulses propagating through the pulse shaper arrangement. An optical switch 72, e.g. a 1×3 switch, has an input port connected to the first dispersive element 71 and output ports connected to the single-photon detector 75, a beam stop or monitoring photodiode 76, and the modulator 73, respectively. The optical switch 72 ensures that no photons of the broadband optical pulse are captured by the single-photon detector 75. Each time the single-photon source is triggered, the optical switch is configured for routing photons from the first dispersive element 71 to the single-photon detector 75. Once a heralding photon has been detected by the single-photon detector, an electrical switching signal is generated at an output of the photodetector 75 and supplied to the optical switch 72. Moreover, a delayed output signal is generated at an output of the photodetector 75 and supplied to the modulator 73 and the optical switch 72. Once the optical switch 72 receives the electrical switching signal, a light path connecting the first dispersive element 71 and the beam stop or monitoring photodiode 76 is established through the optical switch. Furthermore, the optical switch is configured for routing light from the first dispersive element 71 to the modulator 73 as long as the optical switch receives the delayed output signal and for switching back to the routing of light to the beam stop or monitoring photodiode 76 as soon as receiving the delayed output signal ceases.

Figure 8:
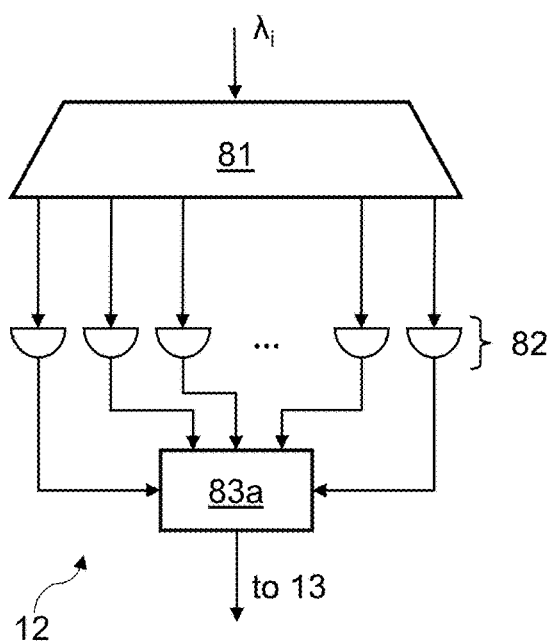
FIG. 8 shows an alternative, spatially dispersing single-photon spectrometer, which can be used in embodiments of the invention.

Referring to FIG. 8, an alternative single-photon spectrometer 12 is shown, which can be used in embodiments of the invention. It comprises a spatially dispersing member 81, such as, but not limited to, an arrayed waveguide grating, a surface grating or grating pair, a grism, a spatial light modulator, a dense wavelength division multiplexing (WDM) module, or combinations thereof. Here, spatially dispersing of light may include physical separation of the light into a plurality of wavelength bands, e.g. wavelength channels. An array of single-photon detectors 82 is configured for receiving the spatially dispersed light such that the position of each single-photon detector in the array correlates with particular wavelength interval (channel) in a plurality of wavelength intervals. For instance, available dense WDM modules include more than 50 channels, e.g. more than 80 channels, e.g. up to 160 channels, which are positioned at regular intervals, e.g. on 100 GHz, 50 GHz, or 25 GHz intervals. Other implementations of spatially dispersing members, e.g. gratings, may define their wavelength intervals/channels differently, e.g. via the aperture of the single-photon detectors. These intervals determine the frequency resolution of received heralding photons, e.g. the intervals define the frequency bins $\delta f_k$ in the active multiplexing range $\Delta f_{MUX}$. Therefore, a linewidth associated with each photon of the generated photon pairs is preferably of the same order of magnitude as the width of each of the plurality of wavelength intervals. Each single-photon detector of the array 82 is adapted for generating a detection signal in response to a heralding photon incident onto that single-photon detector. A readout unit 83a is configured to receive the detection signals of each single-photon detector of the array 82, and the readout unit 83a comprises fast decision electronics which determine the single-photon detector that has been the first to detect a heralding photon after the single-photon source has been triggered. Moreover, the readout unit 83a comprises a pulse delay generator which delivers an electrical output pulse with a delay. This delay is controlled by the readout unit 83a and may be calculated as the sum of a fixed offset and an integer multiple of a unit time step, wherein the integer multiple is linearly related to the positional order (e.g. number index) of the single-photon detector in the array that first detected a heralding photon. Subsequent heralding photons detection events may be recorded but do not cause the readout unit 83a to generated a delayed output signal. Alternatively, the readout unit may determine the delay by comparing the number index of the single-photon detector in the array that first detected a heralding photon to the entries of a look-up table and retrieve a time delay corresponding to this number index in the table. This approach, albeit having a larger latency, has the advantage that nonlinearities in the functional dependence of the delay on the number index, e.g. due to higher-order dispersion effects in the spatially dispersive member 81 and/or a first dispersive member of the pulse shaper arrangement, can be taken into account more accurately.

Figure 9:
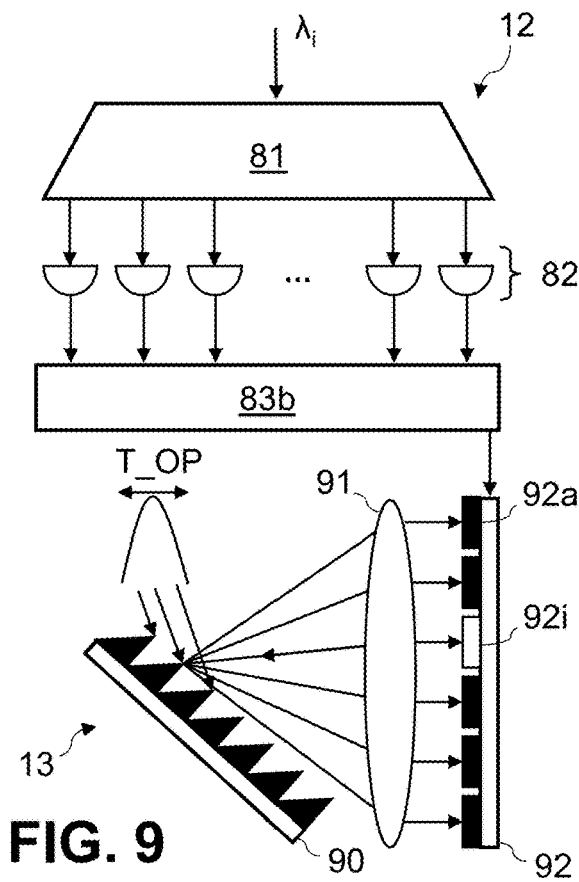
FIG. 9 shows a single-photon spectrometer and a pulse shaper arrangement as parts of a single-photon source according to an alternative embodiment of the invention, in which the pulse shaper comprises a spatially dispersive element and a spatial light modulator in reflection mode.

FIG. 9 shows a single-photon spectrometer 12 and a pulse shaper arrangement 13 as parts of a single-photon source according to an alternative embodiment. The single-photon detector 12 corresponds to that of FIG. 8, except that the readout unit 83b does not generate a delayed output signal. Instead, the readout unit 83 is configured to generate a control signal for controlling a configuration of the elements of a spatial light modulator 92. This control signal is indicative of the number index of the single-photon detector in the array 82 that first detected a heralding photon. The pulse shaper arrangement 13 comprises a dispersive element 90 that disperses the frequency components of the supplied broadband optical pulse in space, e.g. angularly or by separating them into individual wavelength channels. Non-limiting examples of a dispersive element 90 include diffraction gratings or grating pairs, an arrayed waveguide grating, a grism, a dense wavelength division multiplexing (WDM) module, or combinations thereof. The dispersed light of the broadband pulse is directed onto the pixels of the spatial light modulator 92. In some embodiments of the invention, a lens 91 or other collimating means may be inserted into the light path of the dispersed broadband optical pulse so that the dispersed frequency components are collimated and reach the spatial light modulator 92 under normal incidence or at small angles (e.g. less than 15 arc degrees).

The spatial light modulator may comprise a linear array or a 2D matrix of pixels, wherein individual pixels may be implemented as patterned pixel electrodes on a liquid crystal layer (e.g. reflective ferroelectric or nematic liquid crystal on silicon spatial light modulator), deformable MEMS-based reflectors, micromirrors of a digital micromirror device (DMD), patterned pixel electrodes on an electro-absorbing material layer, individually addressable patches of phase-change material, etc. The pixels of the spatial light modulator may modulate the phase and/or amplitude of incident light. For pixels that only modulate the phase of incident light, appropriate polarizers and polarization controllers are also provided so that a phase-modulated optical signal is converted into an amplitude-modulated signal. The individually addressable pixels of the spatial light modulator, e.g. 92a, 92i, may be configured in an "on"-state or an "off"-state. Usually, only one pixel is configured in the "on"-state so that the phase and/or amplitude change of a fraction of the dispersed broadband pulse that is incident on that pixel is reflected back and further transmitted to an output of the pulse shaper arrangement. Contrarily, the remaining pixels are configured in the "off"-state for which a phase and/or amplitude change is insufficient for the respective fractions of the dispersed broadband pulse to be reflective back and/or to be transmitted to the output of the pulse shaper arrangement. This configuration corresponds to a one-to-one relationship between frequency bins in the available multiplexing range $\Delta f_{MUX}$ and respective pixels of the spatial light modulator. In the exemplary situation of FIG. 9, only the pixel 92i is configured in the "on"-state, ensuring that only light in the frequency bin $\delta f_i$ is reflected and transmitted to the output of the pulse shaper arrangement 13. In consequence, the center frequency of the reshaped pulse leaving the pulse shaper arrangement is selected to equal to the center frequency $f_i$ of the detected heralding photon. However, it is also possible to have a one-to-many relationship between frequency bins in the available multiplexing range $\Delta f_{MUX}$ and respective pixels of the spatial light modulator, for instance if the achievable linear dispersion associated with the dispersive element 90, e.g. diffraction grating, is too low to separate broadband pulse light belonging to adjacent frequency bins $\delta f_k$, $\delta f_{k+1}$ onto adjacent pixels of the spatial light modulator. In this case, a group of neighboring pixels may be collectively switched "on" or "off". In the example of FIG. 9, only the portion of the broadband pulse that is comprised in the frequency bin $\delta f_i$ corresponding to the frequency $f_i$ of the first detected heralding photon is reflected back from the spatial light modulator 92, i.e. it is assumed that the spatial light modulator is modulating amplitudes directly. This assumption, as explained before, is not limiting though. The reflected portion of the broadband pulse, i.e. the reshaped pulse, is subsequently redirected to the dispersive element 90. During this second pass, a group delay is imparted onto the reshaped pulse such that the resulting overall group delay through the pulse shaper arrangement 13 does not depend on the center frequency $f_i$ of the reshaped pulse.

Although shown as operating in reflection, the spatial light modulator 92 may be operated in transmission, provided that a reflective surface (e.g. planar mirror) is positioned behind a rear surface of the spatial light modulator, facing away from the dispersive element 90, or a further spatially dispersive element, i.e. spectral combiner, is positioned behind a rear surface of the spatial light modulator. In the latter case, a further lens may be inserted between the further spatially dispersive element and the spatial light modulator, e.g. according to a 4f-configuration.

It is possible to combine previously described embodiments in which the pulse shaper arrangement is configured to either perform a frequency-to-space mapping or a frequency-to-time mapping. This may be of advantage if the available bandwidth of active frequency-multiplexing of heralding photons is so large that a temporal time stretching of the broadband optical pulse by the dispersive element of the pulse shaper arrangement becomes too lossy, or if dispersive elements with a correspondingly large group delay dispersion are not easily obtainable or too expensive to implement. In such a case, the broadband optical pulse may first be spatially dispersed by a first dispersive element. The dispersed light at each spatial location addressed by the first dispersive element, comprising only a subset of frequencies originally contained in the broadband pulse, is subsequently temporally dispersed by a further dispersive element before a light modulating element is selecting the space-time-mapped frequency components that are substantially coinciding with the detected heralding photon frequency or with a constant frequency offset thereof. An exemplary pulse shaper arrangement of this kind may comprise a spatially dispersive element, e.g. a diffraction grating or wavelength de-multiplexing device, which provide a coarse division or splitting of the broadband optical pulse into a moderate number of frequency bands or channels, e.g. tens of frequency bands. Coupled to each output port of the dispersive element, which is associated with a different one of the plurality of coarsely divided frequency bands, is a temporally dispersive element, e.g. a chirped fiber Bragg grating, followed by a light modulating element, e.g. an electrooptic modulator. The temporally dispersive element may have a weaker group delay dispersion than originally required without the spatially dispersive element, e.g. ten times smaller group delay dispersion than originally required. The light modulating element may be terminated by a reflector to reverse a propagation direction of the selected frequency components $f_{sel}$. Alternatively, a further temporally dispersive element, of same group delay dispersion magnitude but opposite sign than the first temporally dispersive member, may be optically connected to an output of each light modulating element operated in transmission and a wavelength combining element, e.g. diffraction grating or wavelength multiplexing device is configured to receive the light output by each further temporally dispersive element and to combine them into a single output. In this exemplary embodiment, the single-photon source may comprise, but is not limited thereto, an electronic conversion unit which is configured to convert a time delay of a delayed output signal generated by the single-photon spectrometer into a delayed address signal for selecting one of the plurality of light modulating elements of the pulse shaper arrangement. To this end, the electronic conversion unit may compare the delayed output signal to an incrementally increasing signal ramped generated via an incremental counter, detect a signal flank of the delayed pulse in the output signal and retrieve the corresponding value of the incremental counter when the signal flank detection occurred. This count value n may be processed by a modular division circuit, which is configured to determine the results of the modulus operation n mod N, where N is the number of light modulating elements or frequency bands of the pulse shaper arrangement. More specifically, the modular division circuit outputs the remainder r of the modulus operation and also provides the result of the truncated division q=floor (N/n). A pulse delay generator then generates the delayed address signal such that a time delay is proportional to the remainder r and the quotient q represents the selected address, e.g. position-encoded addressing of the light modulating elements.

Figure 10:
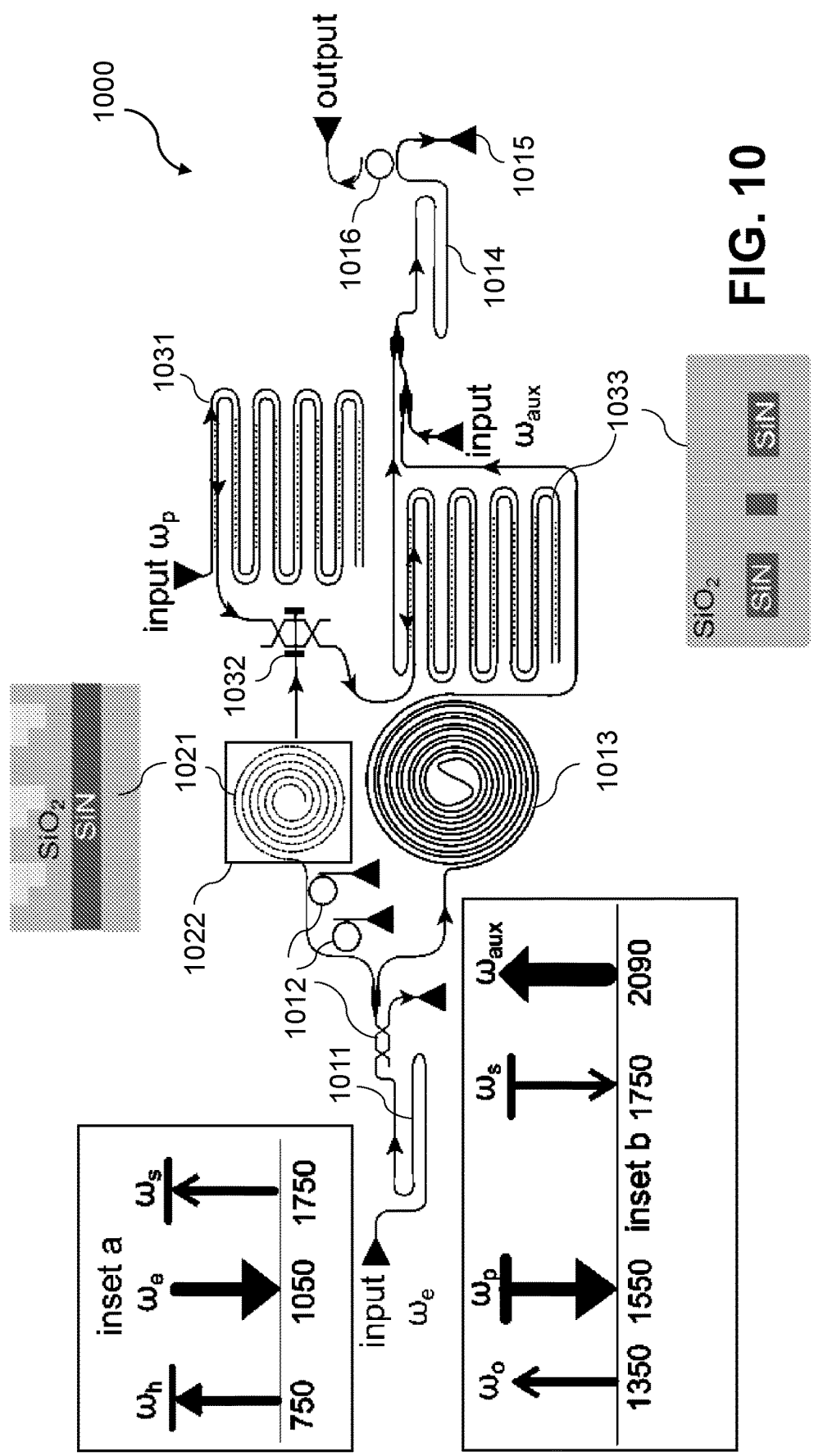
FIG. 10 is a schematic view of a single-photon source in accordance with embodiments of the invention, which is implemented as a photonic integrated circuit.

With reference to FIG. 10, a further embodiment of the invention is now described, which implements the single-photon source as a photonic integrated circuit (PIC), e.g. on chip-scale using a nanophotonic integration technology platform. This platform may be silicon nitride, e.g. rib or ridge waveguides, multiplexers/demultiplexers, filters, gratings, and other functional optical components manufactured in a silicon nitride layer for index guiding, but embodiments of the invention are not limited to this particular platform choice. An advantage of silicon nitride-based PICs is the moderate refractive index contrast thereof, which interfaces well with both higher index contrast platforms, such as InP or Si-based platforms, and lower index contrast platforms such as glass or polymer-based platforms, or LioniX International TriPleX™ waveguide technology, for photonic integration. A further advantage, also shared by other platforms, is its compatibility with CMOS process flows.

The photonic integrated circuit (PIC) 1000 of FIG. 10 provides compact single-photon source. Laser light pulses of a first pulsed pump laser source, centered at frequency $\omega_e$ (e.g. corresponding to a wavelength of $\lambda_e$=1050 nm), may each last about 20 ps and are coupled into the PIC via an input connecter (labelled "input" in FIG. 10), e.g. via a grating coupler, waveguide facet, or the like. For each laser light pulse of the first pump coupled into the PIC 1000, photon pair source 1011 generates at least one photon pair consisting of a heralded photon, e.g. with wavelength in the range from 1700 nm to 1800 nm and expected mean of $\lambda_s$=1750 nm, and heralding photon, e.g. with wavelength in the range from 740 nm to 780 nm and expected mean at $\lambda_h$=750 nm. The photon pair source 1011 may correspond to a waveguide section of the PIC, which has a well-defined cross-section, length and group velocity dispersion profile so that the nonlinear process of degenerate spontaneous four-wave mixing (cf. inset a of FIG. 10) occurs optimally, e.g. with low noise, over a very wide bandwidth, e.g. up to several THz in properly designed SiN waveguide sections. Alternatively, a birefringent waveguide section of the photon pair source 1011 can be configured for polarization phase matching, in which the heralding photon is generated in a TM-mode of the waveguide and the corresponding heralded photon in a TE-mode. After the nonlinear propagation and photon pair generation in the photon pair source 1011, the excess laser light of the first pump is filtered out, using one or more integrated wavelength filter devices 1012, e.g. cascaded wavelength filter devices such as interferometric filters (e.g. of the Mach-Zehnder type), micro-ring resonator filters, or others. Additionally, the heralded photon is separated from the heralding photon and is stored in a delay line 1013, e.g. about 30 cm long, which acts as an optical buffer. This separation of the heralding photon may be realized by means of a wavelength-dependent directional coupler, e.g. broadband directional coupler, or a wavelength-demultiplexing device such as CWDM demultiplexers based on arrayed waveguide gratings, Bragg gratings/Bragg reflectors, etc. Conversely, the heralding photon is supplied to a tilted Bragg grating 1021 which is designed to reflect resonant light upwards, i.e. out of the plane for waveguiding. The Bragg grating 1021 may be patterned into or on top of a waveguide portion of the PIC and is also chirped along its direction of propagation so that longer wavelength components are reflected first while shorter wavelength components are reflected last (normal dispersion slope). A possible side view of the tilted Bragg grating 1021 is also shown in FIG. 10 in the case of a SiN-based photonic integration technology platform. On top of this Bragg grating 1021, a silicon single-photon avalanche photodiode (SPAD) 1022 is provided, which is optimized for operation in the range of heralding photon wavelengths, e.g. about 750 nm. The SPAD detector 1022 may be premanufactured in a CMOS fab and subsequently bonded onto a top surface region of the PIC, which wholly overlaps the Bragg grating 1021. For instance, the SPAD detector 1022 may be placed onto the contact region of the PIC top surface in a flip chip mounting step and contacted by a sequence of DUV patterning, metallization, and lift-off steps. Together, the tilted Bragg grating and the SPAD detector thus form a single-photon spectrometer, wherein the tilted Bragg grating acts as a dispersive member for translating wavelength information of the incoming heralding photon into time information, which is then detected very accurately by the SPAD detector. As illustrated, spectral filtering of the laser pulses of the first pump by a cascade of wavelength filter devices 1012 precedes the detection of the heralding photon in the SPAD detector which, preferably, is substantially transparent, and hence inefficient, to the excitation wavelength of the first pump, whereby extra dark counts in the single-photon detector 1022 are avoided. The detection pulse generated by the SPAD detector 1022, and optionally amplified in the electrical domain, drives an electro-optic amplitude modulator (EOM) 1032. This electro-optic amplitude modulator 1032 may be provided as a hybrid modulator, comprising a waveguide interferometer, micro-ring resonator, or any other device with the same functionality patterned into the waveguide layer of the PIC, e.g. SiN, and overlaid by a layer of electro-optic material with contact electrodes, e.g. a layer of LiNb that is thin relative to the dimension of the waveguide mode supported by the waveguides of the modulator. The electro-optic amplitude modulator 1032 is adapted carve a short and narrowband optical pulse out of the initially broader spectrum of a further laser light pulse with center frequency $\omega_p$ (e.g. corresponding to a wavelength of $\lambda_p$=1550 nm), emitted by a second laser pump source and supplied to the PIC 1000 via a further input connector. Prior to the carving step, the broadband pulse of the second pump is subject to anomalous dispersion in another chirped Bragg grating 1031, whereby each component of the spectral continuum of the broadband pulse is mapped onto a distinct moment in time. In other words, the chirped Bragg grating 1031 assigns different time slots to different spectral components comprised by the broadband pulse of the second pump. In contrast to the chirped and tilted Bragg grating 1021, the chirped Bragg grating does not redirect light out of the PIC waveguiding plane, but reflects propagating light into an adjacent, secondary waveguide via evanescent coupling. A similar Bragg grating 1033 of opposite, i.e. normal dispersion, is used to de-chirp and, therefore, resynchronize the reshaped, narrowband pulse of the second pump after the carving step by the modulator 1032. A possible side view of the tilted Bragg grating 1033 is also shown in FIG. 10 in the case of a SiN-based photonic integration technology platform. In the present embodiment, the amount of dispersion (e.g. −GDD) induced upon chirping the broadband pulse of the second pump inside the Bragg grating 1031 is opposite to the one experienced by the heralding photon inside the tilted Bragg grating 1021 (e.g. +GDD). This sign inversion is the result of the particular four-wave mixing process within the nonlinear waveguide section 1014, which converts the heralded photon into a single output photon at the deterministic output frequency $\omega_o$ of the source, e.g. with deterministic source output wavelength of 1350 nm in the present embodiment (see inset b of FIG. 10). Inset b illustrates that, in order to satisfy overall energy conservation, a heralded photon of wavelength greater than 1750 nm has to be combined with a reshaped pulse of the second pump that has a wavelength smaller than 1550 nm. In other words, the larger the wavelength associated with the heralded photon, the smaller the wavelength of the reshaped classical pulse, carved out by the modulator 1032 from the originally broadband pulse supplied by the second pump, has to be. It is noted that the four-wave mixing process in nonlinear waveguide section 1014 also involves an auxiliary source ($\omega_{aux}$) emitting pulsed light or cw-light at a fixed wavelength of approximately 2090 nm, which is coupled into the PIC via a third input connector. Finally, the converted single-photon for output (e.g. single output photon with deterministic source frequency $\omega_o$) is routed out of the PIC, e.g. via an output coupler such as a grating output coupler, after having passed through a bandpass filter 1015, e.g. a micro-ring resonator filter, which typically has a passband width that is as large or larger than the linewidth of the single output photon. In embodiments of the invention in which the deterministic source output frequency is tunable, i.e. in wavelength-tunable quasi-deterministic single-photon sources, the bandpass filter 1015 is adapted for wavelength-tuning too. More specifically, the bandpass filter 1015 is provided as a wavelength-tunable bandpass filter, e.g. via thermal or electro-optic phase shifters, which has its passband spectrally aligned with the wavelengths of the single-photons emitted on demand at the source output. A benefit of using a single-photon source implemented as a PIC is that further functional blocks acting on the emitted single photon can be juxtaposed with the single-photon source on the same chip. For instance, an encoder for quantum key distribution, e.g. based on time-bin encoding, wavelength encoding, path encoding or polarization encoding can be realized easily on the same chip. Time-bin and wavelength encoding can be implemented using the same circuitry placed at different locations on the chip, wherein the encoding circuitry here relates to a tunable delay line, e.g. delay corresponding to the time interval between two consecutive single output photon emission events, which is either placed at the output side of the single-photon source (time-bin encoding) or at its input side (frequency-bin encoding). An exemplary tunable delay line may comprise two waveguide sections of different optical path length, whose end portions are mutually optically coupled by optical coupling means with variable coupling coefficients, e.g. a pair of wavelength-tunable ring resonators that can be tuned on-resonance and off-resonance so as to provide variable optical coupling at the end portions of the two waveguide sections.

In above-presented embodiments of the inventions, substantially transform-limited photon wave packets with a time duration of about 100 ps were assumed. However, a person of ordinary skill will recognize that the invention can be practiced also with photon wave packets that deviate to some extent from the ideal transform-limited shape, e.g. if some decrease in the success rate of single-photon emission or in the indistinguishability of single photons at the source output is acceptable. It may also be the case that the spectral-temporal shape of the photon wave packets is made the object of a further optimization with respect to the effective number of frequency bins. To this end, laser sources in embodiments of the invention may be configurable to generate laser output pulses with various spectral-temporal shapes. Moreover, embodiments of the invention can be adapted to a time duration of the photon wave packets that is more or less then the mentioned 100 ps, e.g. sub-100 ps photon wave packets can be used instead, e.g. between 10 ps and 100 ps, e.g. between 20 ps and 100 ps, e.g. between 70 ps and 100 ps. The spectral linewidth of exemplary 70 ps long single-photon wave packets (output photon, heralded and heralding photon) may be about 15 GHz.

In above-described embodiments of the invention, the temporally dispersive member of the single-photon spectrometer as well as the first and second dispersive elements of the pulse shaper preferably are characterized by low optical insertion losses (e.g. less than 5 dB, e.g. less than 3 dB, e.g. less than 1 dB), low or ultra-low propagation losses, continuous band operation (e.g. whole C-band or wider) over at least 100 GHz, e.g. at least 300 GHz, e.g. more than 500 GHz, e.g. more than 700 GHz, e.g. more than 1 THz, low latency (e.g. order of nanoseconds), and no penalties caused by nonlinear effects. In preferred embodiments, they may be provided as dispersion compensation modules or dispersion compensation patch cords that comprise fiber Bragg gratings. Group delay dispersion parameters for these components may be larger (positive or negative) than 600 ps/nm, e.g. larger than 1000 ps/nm, e.g. more than 1300 ps/nm.

Other variations to the disclosed embodiments can be understood and effected by those skilled in the art in practicing the claimed invention, from a study of the drawings, the disclosure and the appended claims. The mere fact that certain measures are recited in mutually different dependent claims does not indicate that a combination of these measures cannot be used to advantage. Any reference signs in the claims should not be construed as limiting the scope.

The invention claimed is:

1. A quasi-deterministic single-photon source comprising:
   a photon pair generator configured to generate a narrowband heralding photon and a narrowband heralded photon as a frequency-correlated photon pair upon irradiation with a pulse of pump light, a heralding photon frequency of each photon pair being randomly distributed over an available bandwidth for active frequency-multiplexing of heralding photons and a heralded photon frequency of each photon pair being determined by the heralding photon frequency of that same pair,
   a single-photon spectrometer adapted to generate an output signal upon detection of the heralding photon, said output signal being indicative of the frequency of the detected heralding photon,
   a pulse shaper arrangement for reshaping a broadband optical pulse, the pulse shaper arrangement being operable at least over said available bandwidth for active frequency-multiplexing of heralding photons and configured for:
      (i) receiving output signals generated by the single-photon spectrometer,
      (ii) selecting and transmitting only frequency components of the broadband pulse that coincide with the frequency of the detected heralding photon, or with a constant frequency detuning thereof, thereby reshaping the broadband optical pulse into a narrowband optical pulse,
   an optical frequency converter configured to convert the heralded photon corresponding to the detected heralding photon into a single output photon with deterministic source frequency upon irradiation with a reshaped optical pulse delivered by the pulse shaper arrangement.

2. The single-photon source according to claim 1, wherein the pulse shaper arrangement comprises:
   at least one dispersive element adapted for receiving the broadband optical pulse and inducing therein a first amount of group delay dispersion, and said at least one dispersive element further being adapted for transmitting the selected frequency components of the broadband pulse and inducing therein a second amount of group delay dispersion such that an overall group delay in respect of the reshaped optical pulse is independent of the selected frequency components,
   a pulse picking element arranged to receive the dispersed broadband optical pulse from of a first one of said at least one dispersive element and configured to selectively transmit or reflect, based on the single-photon spectrometer output signal, the frequency components of the broadband pulse to be transmitted by the first or a second one of said at least one dispersive element.

3. The single-photon source according to claim 2, wherein one of said at least one dispersive element comprises one of the groups consisting of: chirped volume Bragg grating, chirped fiber Bragg grating, diffraction grating, prism pair, dispersive optical waveguide.

4. The single-photon source according to claim 2, wherein the at least one dispersive element is either provided as temporally dispersive element or as spatially dispersive element.

5. The single-photon source according to claim 2, wherein the pulse picking element comprises an electro-optic modulator or an electrically addressable spatial light modulator.

6. The single-photon source according to claim 1, further comprising an optical amplifier arranged at an output of the pulse shaper arrangement, for amplifying a reshaped optical pulse.

7. The single-photon source according to claim 1, further comprising at least one light source for generating broadband optical pulses whose spectral bandwidth includes said available bandwidth for active frequency-multiplexing of heralding photons.

8. The single-photon source according to claim 1, wherein the single-photon spectrometer is configured to:
spatially disperse heralding photons into a plurality of frequency channels as a function of the heralding photon frequency,
detect a heralding photon in one of the plurality of frequency channels and select that frequency channel, and
generate and delay said output signal such that center frequencies associated with selected frequency channels are linearly mapped onto corresponding delay times of the delayed output signal.

9. The single-photon source according to claim 8, wherein the single-photon spectrometer comprises an optical wavelength-demultiplexing member, comprising a plurality of frequency channels, and a plurality of photodetectors, each photodetector of the plurality of photodetectors being coupled to a respective one of said plurality of frequency channels and capable of single-photon detection.

10. The single-photon source according to claim 1, wherein the single-photon spectrometer comprises a temporally dispersive member and a single-photon detector connected to the temporally dispersive member, the temporally dispersive member being adapted for inducing a spread in arrival times of heralding photons on said single-photon detector as a function of the heralding photon frequency, and said single-photon detector being configured to detect the arrival time of a heralding photon and generate said output signal with a time delay indicative of the detected arrival time.

11. The single-photon source according to claim 10, wherein the temporally dispersive member is configured to have a group delay dispersion parameter larger than the ratio of a time duration of the heralding photons to said bandwidth for active frequency-multiplexing of heralding photons.

12. The single-photon source according to claim 1, wherein the photon pair generator is provided as a nonlinear optical element configured for photon pair generation by a spontaneous parametric down-conversion process or a spontaneous four-wave mixing process, and
wherein the optical frequency converter is provided as a nonlinear optical element configured for generating said output photon with deterministic source frequency by a sum-frequency generation process or a four-wave mixing process.

13. The single-photon source according to claim 12, wherein the photon pair generator and the optical frequency converter are provided as a single nonlinear optical element.

14. The single-photon source according to claim 1, implemented as an all-fiber arrangement or as a photonic integrated circuit.

15. The single-photon source according to claim 1, wherein the deterministic source frequency of the single output photon is controllably tunable.

16. A method for generating single photons on demand, comprising:
generating a narrowband heralding and heralded photon in a frequency-correlated photon pair, using a nonlinear optical process, so that a frequency of the heralding photon in each photon pair is randomly distributed over an available bandwidth for active frequency-multiplexing of heralding photons and a frequency of the heralded photon in each photon pair is determined by the frequency of the heralding photon generated in that same pair,
detecting the frequency of the heralding photon,
providing a broadband optical pulse whose spectral bandwidth includes said available bandwidth for active frequency-multiplexing of heralding photons,
forming a reshaped optical pulse by selecting only frequency components of the broadband pulse that coincide with the frequency of the detected heralding photon, or with a constant frequency detuning thereof,
converting the heralded photon corresponding to the detected heralding photon into a single output photon with deterministic frequency, by combing said heralded photon with said reshaped optical pulse in a nonlinear optical medium.

17. The method according to claim 16, further comprising:
compensating an overall group delay dispersion in respect of reshaped optical pulses of different selected frequency components, and/or
amplifying said reshaped optical pulse prior to the step of converting the heralded photon into the single output photon.

* * * * *